(12) United States Patent
Hu et al.

(10) Patent No.: US 12,226,725 B2
(45) Date of Patent: Feb. 18, 2025

(54) OIL SLURRY FILTER, OIL SLURRY FILTER UNIT AND OIL SLURRY FILTER SYSTEM CONTAINING THE SAME, AND OIL SLURRY FILTERING PROCESS

(71) Applicants: CHINA PETROLEUM & CHEMICAL CORPORATION, Beijing (CN); RESEARCH INSTITUTE OF PETROLEUM PROCESSING, SINOPEC, Beijing (CN); SUN-CENTRAL (SHANGHAI) MARKETING AND SERVICE CO., LTD, Shanghai (CN)

(72) Inventors: Zhihai Hu, Beijing (CN); Yong Han, Shanghai (CN); Chuanfeng Niu, Beijing (CN); Lingping Wang, Shanghai (CN); Fa Liu, Beijing (CN); Tan Chen, Shanghai (CN); Zhicai Shao, Beijing (CN); Jinshan Xiao, Shanghai (CN); Zhonghuo Deng, Beijing (CN); Shasha Li, Shanghai (CN); Lishun Dai, Beijing (CN); Wei Ye, Shanghai (CN); Qiang Fang, Beijing (CN); Wenjing Xu, Shanghai (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN); SUN-CENTRAL (SHANGHAI) MARKETING AND SERVICE CO., LTD, Shanghai (CN)

( * ) Notice: Subject to any disclaimer, the term of this patent is extended or adjusted under 35 U.S.C. 154(b) by 587 days.

(21) Appl. No.: 17/432,719

(22) PCT Filed: Feb. 20, 2020

(86) PCT No.: PCT/CN2020/076016
§ 371 (c)(1),
(2) Date: Aug. 20, 2021

(87) PCT Pub. No.: WO2020/169064
PCT Pub. Date: Aug. 27, 2020

(65) Prior Publication Data
US 2022/0152534 A1 May 19, 2022

(30) Foreign Application Priority Data

Feb. 20, 2019 (CN) .......................... 201910125079.3
Feb. 20, 2019 (CN) .......................... 201910125364.5
(Continued)

(51) Int. Cl.
*B01D 39/00* (2006.01)
*B01D 35/00* (2006.01)
(Continued)

(52) U.S. Cl.
CPC ......... *B01D 39/083* (2013.01); *B01D 35/005* (2013.01); *B01D 39/1623* (2013.01);
(Continued)

(58) Field of Classification Search
CPC ...... B01D 39/00; B01D 39/08; B01D 39/083; B01D 39/086; B01D 39/14; B01D 39/16;
(Continued)

(56) References Cited

U.S. PATENT DOCUMENTS 1,650,998 A * 11/1927 Nones ................. D03D 11/00
139/383 R
4,206,034 A 6/1980 Broadhurst
(Continued)

FOREIGN PATENT DOCUMENTS

CN 2489853 Y 5/2002
CN 102002385 A 4/2011
(Continued)

OTHER PUBLICATIONS

International Search Report (PCT/ISA/210) with an English translation, and Written Opinion (PCT/ISA/237) mailed on May 19, 2020, by the China National Intellectual Property Administration (ISA/CN) as the International Searching Authority for International Application No. PCT/CN2020/076016. (10 pages).
(Continued)

*Primary Examiner* — Allison G Fitzsimmons
(74) *Attorney, Agent, or Firm* — Panitch Schwarze Belisario & Nadel LLP

(57) ABSTRACT

The present invention provides an oil slurry filter, a filter unit including the oil slurry filter, a multiple-filter system including the oil slurry filter, and a multiple-stage filter system
(Continued)

including the oil slurry filter. Due to the use of the filter component of flexible texture in the oil slurry filter of the present invention, the problems that the filter material is easily blocked by high-viscosity colloidal impurities, the regeneration efficiency of the filter is poor and the filtration efficiency is low are solved, and it is possible to make the backwash treatment of the filter residue more convenient and improve the regeneration efficiency of the filter. The present invention also provides a filtering process using the oil slurry filter to ensure long-term stable operation of the oil slurry filtering process.

25 Claims, 5 Drawing Sheets

(30) Foreign Application Priority Data

Feb. 20, 2019 (CN) .......................... 201910127842.6
Feb. 22, 2019 (CN) .......................... 201910132300.8

(51) Int. Cl.
*B01D 39/08* (2006.01)
*B01D 39/16* (2006.01)
*B01D 29/27* (2006.01)

(52) U.S. Cl.
CPC .......... *B01D 29/27* (2013.01); *B01D 2201/18* (2013.01); *B01D 2239/0208* (2013.01); *B01D 2239/0613* (2013.01); *B01D 2239/1208* (2013.01)

(58) Field of Classification Search
CPC ............ B01D 39/1607; B01D 39/1669; B01D 39/1692; B01D 39/20; B01D 41/00; B01D 41/04; B01D 63/08; B01D 63/081; B01D 63/082; B01D 63/087; B01D 67/00; B01D 67/0002; B01D 69/00; B01D 69/02; B01D 69/06; B01D 69/10; B01D 69/106; B01D 69/107; B01D 69/108; B01D 71/00; B01D 71/06; B01D 71/26; B01D 71/28; B01D 71/38; B01D 71/48; B01D 71/54; B01D 2201/00; B01D 2201/04; B01D 2201/08; B01D 2201/18; B01D 2201/182; B01D 2201/184; B01D 2201/188; B01D 2221/00; B01D 2221/04; B01D 2239/12; B01D 2239/1208; B01D 2239/1216; B01D 2239/1275; B01D 2239/1291; B01D 2257/70; B01D 2325/02; B01D 2325/04; B01D 2325/24; B01D 2325/54
See application file for complete search history.

(56) References Cited

U.S. PATENT DOCUMENTS

| | | | |
|---|---|---|---|
| 2014/0360930 A1 | 12/2014 | Tinkham et al. | |
| 2016/0067641 A1 | 3/2016 | Rodriguez | |
| 2017/0354907 A1* | 12/2017 | Ray | D03D 15/37 |
| 2020/0347556 A1* | 11/2020 | Sealey, II | D04H 1/4282 |

FOREIGN PATENT DOCUMENTS

| | | |
|---|---|---|
| CN | 103865571 A | 6/2014 |
| CN | 104877708 A | 9/2015 |
| CN | 105087051 A | 11/2015 |
| CN | 206244750 U | 6/2017 |
| GB | 1599483 A | 10/1981 |
| TW | 489123 B | 6/2002 |

OTHER PUBLICATIONS

Written Opinion and Search Report issued on Aug. 29, 2022, by the Intellectual Property Office of Singapore in corresponding Singaporean Patent Application No. 11202109133R. (10 pages).

Search Report issued Aug. 18, 2023, by the Taiwan Patent Office in corresponding Taiwanese Patent Application No. 109105549. (1 page).

Office Action issued Dec. 30, 2022, by the Indonesia Patent Office in corresponding Indonesian Patent Application No. P002021007460 and an English translation of the Office Action. (4 pages).

* cited by examiner

OIL SLURRY FILTER, OIL SLURRY FILTER UNIT AND OIL SLURRY FILTER SYSTEM CONTAINING THE SAME, AND OIL SLURRY FILTERING PROCESS

TECHNICAL FIELD

The present invention relates to an oil slurry filter, a filter unit including the oil slurry filter, a multiple-filter system including the oil slurry filter, and a multiple-stage filter system including the oil slurry filter; and the present invention also relates to an oil slurry filtering process by using the oil slurry filter.

BACKGROUND TECHNOLOGY

Catalytic cracking is an important process technology for producing various oil products such as gasoline and diesel oil by converting heavy oil into light oil, and is one of the most important and most widely applied technologies in the field of oil refi(ning at present, but oil slurry (heavy oil) is a byproduct in catalytic cracking, and particularly, hydrogenated residual oil or wax oil mixed with residual oil is mostly adopted as a raw material in catalytic cracking at present, resulting in that the yield of the oil slurry is higher, generally about 5%, and even reaches 8% when the yield is higher. The oil slurry is rich in polycyclic aromatic hydrocarbons, which can be used as raw materials for the production of ship fuel or carbon black, carbon fiber, etc., so the by-produced oil slurry can be put into effective use. However, the by-produced oil slurry usually contains various impurities such as 1-6 g/L catalytic cracking catalyst particles, which cannot meet the raw material index requirements for the production of ship fuel, or carbon black, and carbon fiber and the like. Therefore, the effective utilization of the oil slurry is still a technical problem to be solved in the industry.

In order to improve the utilization value of the oil slurry, the impurities such as the solid particles in the oil slurry must be removed first. In the prior art, in order to remove solid particles in the liquid phase, there are many processes such as sedimentation, flocculation, and centrifugation. However, for the oil slurry, it contains asphaltenes and has a high viscosity, and is even in form of semi-solid at normal temperature. In this case, if the above-mentioned conventional purification process is used, the purification efficiency of the oil slurry will be very low. In addition, filtering is also one of the processes for removing solid particles in the oil slurry, but there are still various problems such as low filtering precision, poor filtering effect, easy abrasion of the filter material of the filter, and low regeneration efficiency of the filter. In addition, in order to improve the filtering accuracy, a multiple-stage filtering process is usually used, but the multi-stage filtering will not solve the above-mentioned problems and usually affect the purification efficiency of the oil slurry.

CN102002385A discloses an apparatus and process for separating residues from catalytic cracking oil slurry, which contains at least two filter groups, each filter group is composed of a pre-filter and a fine filter, and the pre-filter is a wedge-shaped metal winding wire filter element, with a filtering precision of 2-10 micrometers, and the fine filter is an asymmetric metal powder sintered filter element, with a filtering precision of 0.2-1.0 micrometer.

CN103865571A discloses a process for removing solid particles from heavy oil, wherein the filtering system includes at least one pre-filter and at least two fine filters, the filtering precision of the fine filter is better than that of the pre-filter, the pre-filter and the fine filter are connected in series, the heavy oil is filtered through the pre-filter and then passed through the fine filter, so that a filter cake is formed on the fine filter, and the original heavy oil to be filtered is not directly filtered through the fine filter.

As described above, the prior art generally uses a filter group composed of a low-precision pre-filter and a high-precision fine filter with different precisions for filtering, the manufacture thereof is complicated and the cost of the fine filter is relatively high. In addition, when filtering the oil slurry, the asphaltenes in the oil slurry will adhere to the filter material and enter the filter element material, causing deformation, causing the filter element to be blocked, and making it difficult to backwash and regenerate, and this will further aggravate the abrasion of the filter, and shorten the service life of the filter.

SUMMARY OF THE INVENTION

The purpose of the present invention is to provide an oil slurry filter, which can solve the above-mentioned technical problems in the prior art, simplify the filtering operation, improve the filtering effect and filtering efficiency of the filter, and reduce the abrasion of the filter and extend the service life of the filter. In addition, it can make the backwash treatment of the filter residue more convenient and improve the regeneration efficiency of the filter. Furthermore, an object of the present invention is to provide an oil slurry filter unit including the oil slurry filter, a multiple-filter system including the oil slurry filter, a multiple-stage filter system including the oil slurry filter, and an oil slurry filtering process by using the oil slurry filter.

The inventors of the present invention have conducted intensive studies and found that the above technical problems can be solved by using the oil slurry filter including a filter component of specific flexible material of the present invention, thus completing the present invention. Specifically, the inventors of the present invention have found that for an oil slurry filter, if the flexible filter component includes a specific layer, or the flexible filter component is provided with a filter cake layer of the specific filter aid, excellent filtering efficiency and filtering effect can be achieved, the problems of the filtering material being easy to be blocked by high-viscosity colloidal impurities, the regeneration efficiency of the filter being poor, and the filtering efficiency being low are solved, and the backwash treatment of the filter residue can be more convenient and the regeneration efficiency of the filter can be improved. In the present invention, the following embodiments can be provided.

An oil slurry filtering unit, in said filter unit are provided at least one filter, and an oil slurry inlet pipeline, a filtered oil outlet pipeline and a filter residue discharge pipeline respectively in communication with each filter;

the filter is provided with a pinhole-free filter bag of flexible filtering material; the flexible filtering material is one or more selected from polypropylene, polyethylene, nylon, polyester fiber, polyphenylene sulfide, polyimide, polytetrafluoroethylene, aramid fiber, polyurethane, and glass fiber, or a material obtained by the combination of any two or more of the above materials;

said flexible filtering material has a filtering precision of 2-15 micrometers; the flexible filtering material has a basis weight of 520-660 g/m$^2$; said flexible filtering material is at least provided with a solid-removal layer and a base cloth layer, and said solid-removal layer has a porosity of 85%-98%, and said base cloth layer has a porosity of 30%-40%.

An oil slurry filter system, which includes a filter unit and a filter aid buffer tank. The filter unit is provided with at least one filter, and an oil slurry inlet pipeline, a filtered oil outlet pipeline, and a filter residue discharge pipeline respectively in communication with each filter, and the outlet of the filter aid buffer tank is in communication with the oil slurry inlet of the filter.

The filter is provided with a pinhole-free filter bag of flexible filtering material; the flexible filtering material is one or more selected from polypropylene, polyethylene, polyamide fiber, polyester fiber, polyphenylene sulfide, polyimide, polytetrafluoroethylene, aramid fiber, polyurethane, glass fiber, and vinylon, or a material obtained by the combination of any two or more of the above materials;

said flexible filtering material has a filtering precision of 3-25 micrometers; the flexible filtering material has a porosity of 85%-98% and a basis weight of 300-1000 g/m$^2$.

A multiple-filter oil slurry filter system, which includes a filter unit and a control system;

the filter unit is provided with at least two filters, and an oil slurry inlet pipeline, a filtered oil outlet pipeline, a purge medium inlet pipeline and a filter residue discharge pipeline respectively in communication with each filter;

the filter is provided with a pinhole-free filter bag of flexible filtering material;

the flexible filtering material is one or more selected from polypropylene, polyethylene, nylon, polyester fiber, polyphenylene sulfide, polyimide, polytetrafluoroethylene, aramid fiber, polyurethane, and glass fiber, or a material obtained by the combination of any two or more of the above materials;

said control system includes an online pressure difference monitoring module, a filter control module and a purge control module, said online pressure difference monitoring module is used to monitor the pressure difference of the filter used online, said filter control module is used to control a single filter to switch on and switch off the filter system, and said purge control module is used to control the blowback process of the filter.

A multiple-stage oil slurry filter system, including a primary filter unit, a secondary filter unit and/or a tertiary filter unit;

said primary filter unit is provided with at least one filter, and an oil slurry inlet pipeline, a filtered oil outlet pipeline, and a filter residue discharge pipeline respectively in communication with each filter; the first filter is provided with a pinhole-free filter bag of flexible filtering material; the flexible filtering material is one or more selected from polypropylene, polyethylene, polyamide fiber, polyester fiber, polyphenylene sulfide, polyimide, polytetrafluoroethylene, aramid fiber, polyurethane, and glass fiber, or a material obtained by the combination of any two or more of the above materials; the flexible filtering material has a basis weight of 520-660 g/m$^2$;

said secondary filter unit is provided with an automatic backwashing filter device having a driving means;

said tertiary filter unit is provided with at least one second filter, and in said filter is provided with a pinhole-free filter bag of flexible filtering material; the flexible filtering material is one or more selected from polypropylene, polyethylene, polyamide fiber, polyester fiber, polyphenylene sulfide, polyimide, polytetrafluoroethylene, aramid fiber, polyurethane, glass fiber, and vinylon, or a material obtained by the combination of any two or more of the above materials;

the filtering precision of the filtering material of the primary filter unit is 2-15 micrometers, the filtering precision of the filtering material of the secondary filter unit is less than the filtering precision of the filtering material of the primary filter unit, and the filtering precision of the filtering material of the tertiary filter unit is less than the filtering precision of the filtering material of the primary filter unit;

the filtered oil outlet pipeline of the primary filter unit is in communication with the inlet pipeline of the secondary filter unit and the inlet pipeline of the tertiary filter unit respectively.

An oil slurry filtering process by using the aforementioned filter system, which comprises:

the oil slurry is sent to the filter through the oil slurry inlet pipeline in communication with the filter to carry out the filtering, and the filter is provided with a pinhole-free filter bag of flexible filtering material, and the filtered oil is extracted from the filtered oil outlet pipeline; said oil slurry is a liquid hydrocarbon with particle impurities.

An oil slurry filtering process, which comprises:

(1) after a filter aid and a mixing medium are fully mixed in the filter aid buffer tank, they are added to the filter through the oil slurry inlet pipeline in communication with the filter, when a filter cake is formed on the surface of the pinhole-free filter bag of flexible filtering material, the addition of filter aid is stopped;

(2) the oil slurry is sent to the filter through the oil slurry inlet pipeline in communication with the filter to carry out the filtering, and the filter is provided with a pinhole-free filter bag of flexible filtering material, and the filtered oil is extracted from the filtered oil outlet pipeline, said oil slurry is a liquid hydrocarbon with particle impurities.

An oil slurry filtering process by using the multiple-filter oil slurry filter system, which comprises:

(1) the filter unit is provided with at least two filters, the oil slurry is sent to at least one online filter through the oil slurry inlet pipeline in communication with the filter to carry out the filtering, and the filter is provided with a pinhole-free filter bag of flexible filtering material, and the filtered oil is extracted from the filtered oil outlet pipeline;

(2) said control system includes an online pressure difference monitoring module, a filter control module and a purge control module, said online pressure difference monitoring module is used to monitor the pressure difference of the online filter, said filter control module is used to control a single filter to switch on and switch off the filter system, and said purge control module is used to control the blowback process of the filter;

when the online pressure difference monitoring module monitors that the pressure difference of the online filter reaches or is higher than a set value, a backup filter is switched on the filter system through the filter control module, and the filter of which the pressure difference reaches or is higher than the set value is switched off the filter system, the filter that is switched off the filter system is subjected to the residue unloading and the blowback with a purge medium through the purge control module;

said oil slurry is a liquid hydrocarbon with particle impurities.

An oil slurry filtering process by using the multiple-filter oil slurry filter system, which comprises:

(1) the filter unit is provided with at least two filters, the oil slurry is sent to at least one online filter through the oil slurry inlet pipeline in communication with the filter to carry out the filtering, and the filter is provided with a pinhole-free filter bag of flexible filtering material, and the filtered oil is extracted from the filtered oil outlet pipeline;

(2) said control system includes an online pressure difference monitoring module, a filter control module and a purge control module, said online pressure difference monitoring module is used to monitor the pressure difference of the online filter, said filter control module is used to control a single filter to switch on and switch off the filter system, and said purge control module is used to control the blowback process of the filter;

when the online pressure difference monitoring module monitors that the pressure difference of the online filter reaches a set value, a backup filter is switched on the filter system through the filter control module, and after a filter cake is formed on the pinhole-free filter bag of the backup filter, the online filter of which the pressure difference reaches or is higher than the set value is switched off the filter system, the filter that is switched off the filter system is subjected to the residue unloading and the blowback through the purge control module;

said oil slurry is a liquid hydrocarbon with particle impurities.

An oil slurry filtering process by using the multiple-stage oil slurry filter system, which comprises:

The oil slurry is sent to the first filter having a pinhole-free filter bag of flexible filtering material through the oil slurry inlet pipeline in communication with the primary filter unit to carry out the filtering, and the filtered oil is extracted from the filtered oil outlet pipeline and is sent to the secondary filter unit and/or the tertiary filter unit to carry out the further filtering;

said secondary filter unit is provided with an automatic backwashing filter device having a driving means;

said tertiary filter unit is provided with at least one second filter having a pinhole-free filter bag of flexible filtering material;

said oil slurry is a liquid hydrocarbon with particle impurities.

INVENTION EFFECT

Through the filter including the filter component of flexible texture of the present invention, the excellent effects of strong particle interception, high filtering precision, and good material strength can be achieved. In addition, due to using the filter component of flexible texture, the shortcoming of hard filter components being easily blocked by fine solid particles is overcome, the filtering efficiency is improved and the operation period of the oil slurry filter is extended.

In addition, with the filter including the filter component of flexible texture of the present invention, it is possible to reduce the abrasion of the filter, extend the service life of the filter, make the backwash treatment of the filter residue more convenient, and improve the regeneration efficiency of the filter.

In addition, due to providing a filter cake layer of the filter aid on the filter component of flexible texture of the present invention, the filtering effect of the filter can be improved, and the service life of the filter can be prolonged.

Furthermore, with the filter of the present invention, the long-term stable operation of the filtering process of the high-concentration colloidal viscous catalyst stream-containing oil slurry can be realized, which solves the problems of the filter material being easily blocked by high-viscosity colloidal impurities and the poor regeneration efficiency of the filter and the low filtering efficiency. In addition, the filter of the present invention has a diversified and flexible manner for the residue unloading, which effectively solves the problem of environmental pollution caused by catalyst organic materials.

With the multiple-stage filter system of the present invention, a secondary filter unit and/or a tertiary filter unit are provided downstream of the primary filter unit, which further improves the overall filtering precision of the filter system and improves the filtering effect.

With the multiple-filter system of the present invention, the filtering operations can be performed alternately, and the filtering efficiency of the oil slurry can be further improved.

DETAILED DESCRIPTION

Figure 1:
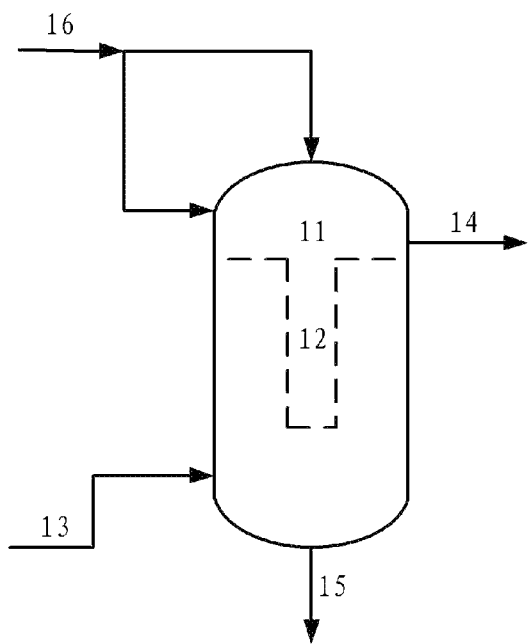
FIG. 1 is a schematic diagram of an embodiment of the oil slurry filter unit of the present invention.

The present invention will be further described below in conjunction with specific embodiments, but the following embodiments do not constitute a limitation to the present invention. That is, the scope of the present invention is not to be limited by these specific embodiments, but rather by the claims appended hereto.

All publications, patent applications, patents, and other references mentioned in this specification are herein incorporated by reference in their entirety. Unless defined otherwise, all technical and scientific terms used herein have the same meanings as commonly understood by those skilled in the art to which this invention belongs. In case of conflict, the present specification, including definitions, will control.

When a material, a substance, a method, a step, a device, a component or the like is derived by an expression/prefix such as "well known to those skilled in the art", "well known in the art", "prior art", or synonyms thereof in the specification, the object derived by the expression/prefix covers not only those conventionally used in the art at the time of filing this application, but also those that are not currently commonly used, but will become known in the art to be suitable for the similar purpose.

In the context of this specification, except for what is explicitly stated, any item or matter not mentioned is directly applicable to those known in the art without any changes. Moreover, any of the embodiments described herein can be freely combined with one or more other embodiments described herein, and the resulting technical solutions or technical ideas are regarded as part of the original disclosure or the original record of the present invention, and should not be regarded as new content that has not been disclosed or anticipated in this specification, unless those skilled in the art believe that the combination is obviously unreasonable.

In the absence of an explicit indication, all percentages, parts, ratios and the like mentioned in this specification are based on the weight, unless the basis on the weight is not consistent with the conventional knowledge of those skilled in the art.

In practicing or testing the present invention, methods and materials similar or equivalent to those described herein can be used, but applicable methods and materials have been described herein.

Oil Slurry Filter

The present invention provides an oil slurry filter, which includes at least one filter component of flexible texture. The filter component (sometimes referred to as filter material in the present invention) is used to filter the oil slurry, so that impurities such as catalyst particles in the oil slurry can be filtered out. In the present invention, the oil slurry is a liquid hydrocarbon containing particle impurities, and preferably the oil slurry is a liquid hydrocarbon containing catalytic cracking oil slurry and/or coal tar. In the present invention, said filter component of flexible texture is formed of a pinhole-free filter material of flexible texture (hereinafter also referred to as flexible filter material).

The flexible filter material of the present invention has excellent chemical stability, good abrasion resistance and fatigue resistance, and has the characteristics of strong interception of particles, high filtering precision, and good material strength. In addition, in the present invention, by adopting the filter component of flexible texture, the shortcoming of the hard filter material being easily blocked by fine solid particles is overcome, the filtering efficiency is improved, the operation period of the oil slurry filter is prolonged, and the wear of the filter is reduced, and the service life of the filter is extended.

In the present invention, the manner in which a pinhole-free filter material of flexible texture (flexible filter texture) forms a filter component is not particularly limited, as long as it can achieve the filtering. In one embodiment of the present invention, the flexible filter material can be formed into the form of flat membrane, hemisphere, bag and the like, so as to be used in the filter component. From the perspectives of the filtering efficiency, the filtering effect, the subsequent treatment of filter residues, the filter regeneration efficiency and the like, the form of bag is preferable, herein, the form of the filter component of the present invention may be a pinhole-free filter bag of flexible texture (hereinafter also known as flexible filter bag).

In an embodiment of the present invention, as the raw material that can be made into the pinhole-free filter material of flexible texture (flexible filter material), it can be at least one material selected from polypropylene, polyethylene, nylon, polyamide fiber, polyester fiber, polypropylene fiber, polyphenylene sulfide, polyimide, polytetrafluoroethylene, aramid fiber, polyurethane, glass fiber, and vinylon. In an embodiment of the present invention, the raw material for the flexible filter material may be a material obtained by the combination of any two or more of the above materials.

In an embodiment of the present invention, said flexible filter material has a filtering precision of 0.1-25 micrometers, preferably 0.1-15 micrometers, further preferably 0.1-10 micrometers. In an embodiment of the present invention, said flexible filter material has a filtering precision of 2-25 micrometers. In an embodiment of the present invention, said flexible filter material has a filtering precision of 2-15 micrometers, preferably 2-10 micrometers. In addition, without being limited by any theory, the inventors have found that when the filtering precision of the flexible filter material is less than 2 micrometers, compared with the case where the filtering precision is 2 micrometers or more, not only the filter efficiency of the filter is improved, but also a high removal rate can be reached in a shorter period, that is, solid particles can be removed efficiently without forming a filter cake or forming a very thin filter cake. Accordingly, in an embodiment of the present invention, the filtering precision of said flexible filter material can be 0.1 to less than 2 micrometers.

Filtering precision refers to the size of the largest particles that are allowed to pass when a solution containing impurities passes through the filter material of the filter. In the present invention, the smaller the filtering precision is, that is, the smaller the numerical value of the filtering precision is, the smaller the solid particles that can be filtered and intercepted are, the better the filtering precision is.

In an embodiment of the present invention, the flexible filter material has a basis weight of 300-1000 g/m2, preferably 520-660 g/m$^2$.

In an embodiment of the present invention, said flexible filter material has a warp-direction breaking strength of 850 N/5 cm-9000 N/5 cm, a weft-direction breaking strength of 1000 N/5 cm-11000 N/5 cm, preferably a warp-direction breaking strength of 1000 N/5 cm-2400 N/5 cm, a weft-direction breaking strength of 1200 N/5 cm-2600 N/5 cm. In an embodiment of the present invention, the flexible filter material has a thickness of 0.5-3.4 mm, preferably 0.5-3.0 mm, more preferably 1.8-2.9 mm. In an embodiment of the present invention, when said flexible filter material has a filtering precision of 0.1 to less than 2 micrometers, the flexible filter material has a thickness of 0.5-3.4 mm, preferably 0.5-3.0 mm.

In the present invention, when the flexible filter material is used in the oil slurry filter, the pressure difference (the pressure difference when the collection of the filtered oil is started) is 0.01-0.5 MPa. The lower limit for the used pressure difference can be 0.02 MPa or 0.04 MPa; and the upper limit for the used pressure difference can be 0.4 MPa or 0.30 MPa. When the pressure difference is lower than 0.01 MPa, the filtered oil slurry cannot form an effective filter cake on the filter material, and an excellent filtering effect cannot be achieved. On the other hand, when the pressure difference is higher than 0.5 MPa, it will cause damage to the flexible filter material, resulting in a decreased efficiency of the flexible filter material in the subsequent filtering and a shortened service life.

The oil slurry filter of the present invention includes at least one flexible filter material. In an embodiment of the present invention, the flexible filter material in the filter of the present invention can be a single layer (one) or a multiple-layer (two or more). In the case of the multiple-layer form, the multiple-layer flexible filter material is laminated; herein, there are no restrictions on the number of laminated layers and the arrangement between the layers. In an embodiment of the present invention, the oil slurry filter includes 1, 2, 3, 4, 5, 6 or 7 flexible filter materials.

In an embodiment of the present invention, the flexible filter bag is prepared by a process known in the art, preferably by a stitching process, and the pores from stitching are sealed with an acidic sealant material.

In an embodiment of the present invention, said flexible filter material at least includes a solid-removal layer and a base cloth layer. Said base cloth layer is obtained by weaving the above-mentioned raw material that can be made into a flexible filter material with a weaving technique known in the art. There is no limitation on the weaving technology, including but not limited to spunlace, thermal bonding, wet weaving, spunbond, meltblown, needle punch, stitch, hot rolling, and the like. Said solid-removal layer is formed on the base cloth layer by using processes known in the art such as hot pressing, film coating, and hot rolling, using the aforementioned raw materials that can be made into flexible filter material. The solid-removal layer and the base cloth layer of the present invention can be each independently successively prepared, or can be integrally prepared. The flexible filter material of the present invention at least including a solid-removal layer and a base cloth layer can be prepared by processes known in the art, or commercially available products can also be used.

In an embodiment of the present invention, said solid-removal layer has a porosity of 25%-98%. In an embodiment of the present invention, said solid-removal layer has a porosity of 85%-98%. In an embodiment of the present invention, said solid-removal layer has a porosity of 30%, 35%, 40%, 45%, 50%, 55%, 60%, 65%, 70%, 75%, 80% or 90%. In an embodiment of the present invention, the porosity of the solid-removal layer is any combination of the above-mentioned values. In an embodiment of the present invention, when said flexible filter material has a filtering precision of 0.1 to less than 2 micrometers, said solid-removal layer has a porosity of 25%-70%, preferably 30%-65%.

In an embodiment of the present invention, said base cloth layer has a porosity of 30%-40%. In the present invention, by forming a solid-removal layer on the base cloth layer, the filtering effect of the filtering material can be further improved, and the service life of the filter can be prolonged.

In an embodiment of the present invention, said base cloth layer is made from polytetrafluoroethylene and/or polyphenylene sulfide. That is, the material of the base cloth layer is polytetrafluoroethylene alone, or polyphenylene sulfide alone, or a composite material of these two materials. In an embodiment of the present invention, the base cloth layer is obtained by processing polytetrafluoroethylene filament fibers.

In an embodiment of the present invention, in order to achieve a better filtering effect of the oil slurry, the solid-removal layer is made from polytetrafluoroethylene with a three-dimensional void structure.

In an embodiment of the present invention, the flexible filter material at least includes a solid-removal layer and a base cloth layer, but is not limited thereto, and can be changed and derivatized on this basis. For example, on the basis of the solid-removal layer and the base cloth layer of the present invention, other layers may be further included without adversely affecting the effect of the present invention. In an embodiment of the present invention, the solid-removal layer and the base cloth layer are arranged adjacent to each other. In an embodiment of the present invention, the flexible filter material only contains the solid-removal layer and the base cloth layer.

For the flexible filter material of the present invention including a solid-removal layer and a base cloth layer, the solid-removal layer is preferably a surface layer, that is, when the flexible filter material is used in an oil slurry filter, the oil slurry to be filtered first contacts the solid-removal layer.

In an embodiment of the present invention, the flexible filter material is made from the aforementioned solid-removal layer, the aforementioned base cloth layer, and optionally other layers. That is, the flexible filter material itself can be divided into the base cloth layer, the solid-removal layer and optionally other layers.

In an embodiment of the present invention, on the basis of the above-mentioned solid-removal layer and base cloth layer, the flexible filter material further includes a lining layer. That is, the flexible filter material of the present invention includes at least 3 layers, successively the solid-removal layer, the base cloth layer and the lining layer.

In an embodiment of the present invention, the lining layer is made from fibers with a fineness of 1-3D by a process known in the art (for example, needle-punching process or spunlace process, etc.) on a side of the base cloth layer opposite to the solid-removal layer. In an embodiment of the present invention, the raw material that is used to be made into the fibers of the lining layer can be selected from the above-mentioned raw materials that can be made into flexible filter material. In an embodiment of the present invention, the raw material that is used to be made into fibers of the lining layer is one or more selected from polyethylene, nylon, polyester fiber, polypropylene fiber, polyphenyl thioether, polyimide, polytetrafluoroethylene, aramid fiber, polyurethane, and glass fiber; preferably one or more selected from polyimide, polytetrafluoroethylene, polyphenylene sulfide, and glass fiber.

In an embodiment of the present invention, the lining layer of the present invention is preferably made from high-strength fibers, which can further improve the strength of the flexible filter material, and reduce the risk of plastic deformation of the flexible filter material under long-term continuous load, and extend the performance period of the oil slurry filter, and extend the service life of the filter.

In an embodiment of the present invention, when the flexible filter material at least includes a solid-removal layer, a base cloth layer and a lining layer, the solid-removal layer and the base cloth layer are consistent with the solid-removal layer and the base cloth layer of the present invention as described hereinbefore.

In an embodiment of the present invention, on the basis of the solid-removal layer, the base cloth layer and the lining layer, the flexible filter material may further include other layers without adversely affecting the effect of the present invention. In an embodiment of the present invention, the flexible filter material only includes a solid-removal layer, a base cloth layer and a lining layer.

In an embodiment of the present invention, the flexible filter material is made from the above-mentioned solid-removal layer, base cloth layer, lining layer and optionally other layers. That is, the flexible filter material itself can be divided into the base cloth layer, the solid-removal layer, the lining layer and optionally other layers.

For the flexible filter material of the present invention including a solid-removal layer, a base cloth layer and a lining layer, the solid-removal layer is preferably a surface layer, that is, when the flexible filter material is used in an oil slurry filter, the oil slurry to be filtered first contacts the solid-removal layer.

The flexible filter material of the present invention at least including a solid-removal layer, a base cloth layer and a lining layer can be prepared by a process known in the art, or it can be a commercially available product.

In an embodiment of the present invention, on the basis of the above-mentioned solid-removal layer and base cloth layer, the flexible filter material of the present invention further includes a precision layer and a lining layer. That is, the flexible filter material of the present invention at least includes 4 layers, successively the solid-removal layer, the precision layer, the base cloth layer and the lining layer.

In an embodiment of the present invention, the precision layer is made from superfine fibers having a fineness of 0.2-0.3D on the base cloth layer between the solid-removal layer and the base cloth layer by a process known in the art (for example, needle-punching process or spunlace process, etc.). In an embodiment of the present invention, the raw material that is used to be made into the superfine fibers of the precision layer can be selected from the above-mentioned raw materials that can be made into flexible filter material. In an embodiment of the present invention, the raw material that is used to be made into the superfine fibers of the precision layer is one or more selected from polyethylene, nylon, polyester fiber, polypropylene fiber, polyphenyl thioether, polyimide, polytetrafluoroethylene, aramid fiber, polyurethane, and glass fiber; preferably one or more selected from polyimide, polytetrafluoroethylene, polyphenylene sulfide, and glass fiber.

In an embodiment of the present invention, the precision layer is made from superfine fibers whose fineness is smaller than that of the lining layer. Without being limited by any theory, the inventor of the present invention believes that due to the interaction between these superfine fibers to form a three-dimensional structure, the filtering efficiency and filtering precision of the flexible filter material can be further improved. On the other hand, by using superfine fibers with a smaller fineness, the surface contact area and surface tension can be enlarged, so that the bond between the solid-removal layer and the precision layer, and the bond between the solid-removal layer and the base cloth layer become stronger, and the falling-off is avoided, thereby further extending the life cycle of the flexible filter material.

In an embodiment of the present invention, when the flexible filter material at least includes a solid-removal layer, a precision layer, a base cloth layer and a lining layer, the solid-removal layer, the base cloth layer and the lining layer are consistent with the solid-removal layer, the base cloth layer and the lining layer of the present invention as described hereinbefore.

For the flexible filter material of the present invention including a solid-removal layer, a precision layer, a base cloth layer and a lining layer, the solid-removal layer is preferably a surface layer, that is, when the flexible filter material is used in an oil slurry filter, the oil slurry to be filtered first contacts the solid-removal layer.

In an embodiment of the present invention, the flexible filter material is made from the above-mentioned solid-removal layer, precision layer, base cloth layer and lining layer. That is, the flexible filter material itself can be divided into a solid-removal layer, a precision layer, a base cloth layer and a lining layer.

In an embodiment of the present invention, without adversely affecting the effect of the present invention, on the basis of the solid-removal layer, the precision layer, the base cloth layer and the lining layer, the flexible filter material of the present invention may further optionally include other layers. In an embodiment of the present invention, the flexible filter material only includes a solid-removal layer, a precision layer, a base cloth layer and a lining layer.

The flexible filter material of the present invention at least including a solid-removal layer, a precision layer, a base cloth layer and a lining layer can be prepared by a process known in the art, or it can be a commercially available product.

In an embodiment of the present invention, the filter component includes a filter cake layer formed from a filter aid provided on said filter component (hereinafter, sometimes also known as a filter cake layer of the filter aid).

In an embodiment of the present invention, in the filter component, a filter cake layer formed from a filter aid may be provided on the pinhole-free filter material. In an embodiment of the present invention, in the filter component, a filter cake layer formed from a filter aid may be provided on said flexible filter material.

In an embodiment of the present invention, said filter aid is selected from diatomite, cellulose, perlite, talcum powder, activated clay, filter residue obtained from a filter, spent catalytic cracking catalysts or mixtures thereof.

In an embodiment of the present invention, in case that the filter cake layer formed from a filter aid is provided on the flexible filter material, said flexible filter material has a filtering precision of 3-25 micrometers. In an embodiment of the present invention, in case that the filter cake layer formed from a filter aid is provided on the flexible filter material, said flexible filter material has a basis weight of 300-1000 g/m$^2$. In an embodiment of the present invention, in case that the filter cake layer formed from a filter aid is provided on the flexible filter material, said flexible filter material has a thickness of 0.5-3.0 mm. In an embodiment of the present invention, in case that the filter cake layer formed from a filter aid is provided on the flexible filter material, said flexible filter material has a warp-direction breaking strength of 1000 N/5 cm-9000 N/5 cm, a weft-direction breaking strength of 1000 N/5 cm-11000 N/5 cm.

In an embodiment of the present invention, the filter cake layer formed from the filter aid has a thickness of 0.1-10 mm.

In an embodiment of the present invention, after the filter cake layer formed from a filter aid is provided on said filter component, the pressure difference of the filter component is 0.01-0.07 MPa. When the pressure difference is lower than 0.01 MPa, an effective filter cake layer of the filter aid cannot be formed on the filter material, and the excellent filtering effect cannot be achieved or the service life of the filter cannot be prolonged; when the pressure difference is greater than 0.07 MPa, for the pressure difference used for the filter, the reserved pressure difference rising space is reduced, resulting in the reduced effective time for the filtering of the oil slurry.

In an embodiment of the present invention, the filter component of the present invention includes a filter cake layer formed from a filter aid provided on the above-mentioned flexible filter bag.

In an embodiment of the present invention, the filter component of the present invention includes a filter cake layer formed from a filter aid provided on the above-mentioned flexible filter material at least including a solid-removal layer and a base cloth layer.

In an embodiment of the present invention, the filter component of the present invention includes a filter cake layer formed from a filter aid provided on the above-mentioned flexible filter material at least including a solid-removal layer, a base cloth layer and a lining layer.

In an embodiment of the present invention, the filter component of the present invention includes a filter cake layer formed from a filter aid provided on the above-mentioned flexible filter material at least including a solid-removal layer, a precision layer, a base cloth layer and a lining layer.

In an embodiment of the present invention, the filter component of the present invention includes a filter cake layer formed from a filter aid provided on the above-mentioned flexible filter material at least including a solid-removal layer, a precision layer, a base cloth layer, a lining layer and optionally other layer(s).

In an embodiment of the present invention, the filter of the present invention further includes an oil slurry inlet and a filtered oil outlet. In an embodiment of the present invention, the filter of the present invention further includes an oil slurry inlet, a filtered oil outlet and a filter residue outlet. In an embodiment of the present invention, the filter of the present invention is an up-flow filter, that is, an oil slurry inlet is arranged at the lower part of the filter, a filtered oil outlet is arranged at the upper part of the filter, and a filter residue outlet is arranged at the lower part and/or the bottom of the filter as required. In an embodiment of the present invention, the filter of the present invention is a downflow filter, that is, an oil slurry inlet is arranged at the upper part of the filter, a filtered oil outlet is arranged at the lower part of the filter, and a filter residue outlet is arranged at the upper part and/or the top of the filter as required. From the perspectives of filtering effect, filtering efficiency, filter residue post-treatment, filter regeneration efficiency, and the like, the filter is preferably an up-flow filter, that is, an oil slurry inlet is arranged at the lower part of the filter, a filtered oil outlet is arranged at the upper part of the filter, and a filter residue outlet is arranged at the lower part and/or the bottom of the filter as required.

In an embodiment of the present invention, the filter of the present invention further includes a purge medium inlet. In an embodiment of the present invention, when the filter is an up-flow filter, a purge medium inlet is provided on the top and/or upper part of the filter. In an embodiment of the present invention, when the filter is a downflow filter, a purge medium inlet is provided on the bottom and/or lower part of the filter. In a preferable embodiment of the present invention, the filter is an up-flow filter, a purge medium inlet is provided on the top and/or upper part of the filter. With the flexible filter material and the up-flow filtering manner of the present invention, the residue unloading post-treatment and the filter regeneration can be carried out efficiently and simply, thereby effectively removing the filter residue and improving the regeneration effect of the flexible filter material.

In an embodiment of the present invention, the filter of the present invention further includes a filter aid inlet. In an embodiment of the present invention, when the filter is an up-flow filter, a filter aid inlet is provided on the lower part of the filter. In an embodiment of the present invention, when the filter is a downflow filter, a filter aid inlet is provided on the upper part of the filter. In an embodiment of the present invention, the filter aid inlet is the oil slurry inlet, that is, the oil slurry inlet is also used as the filter aid inlet.

In the present invention, whether it is an up-flow filter or a downflow filter, the oil slurry inlet, the filter aid inlet, and the filter residue outlet are all located in the upstream of the filter component in the filter; the filtered oil outlet, and the purge medium inlet are both located in the downstream of the filter component in the filter.

Oil Slurry Filter Unit

The present invention provides an oil slurry filter unit (hereinafter sometimes also called filter unit), said oil slurry filter unit includes at least one aforementioned oil slurry filter of the present invention.

In the present invention, said oil slurry filter unit can include one filter, or can include two or more filters. When more than two filters are included, the present invention has no limitation on the connection form of the filters. In an embodiment of the present invention, two or more filters can be arranged in parallel. In an embodiment of the present invention, two or more filters can be arranged in series. In an embodiment of the present invention, two or more filters can be used by the switching between in parallel and in series. In an embodiment of the present invention, when the number of filters is more than 2, the filters can be arranged in the mixing of in parallel and in series. When two or more filters are included, the two or more filters can be filters with the same filtering precision, or filters with inconsistent filtering precision, or filters with partly consistent and partly inconsistent filtering precisions. When the filter unit of the present invention includes two or more filters, the filter precision of the filter unit is the filter precision of the whole filter unit itself. That is, it is the size of the largest particle that can be allowed to pass through the filter unit when the solution containing impurities passes through the filter unit.

In an embodiment of the present invention, the oil slurry filter unit of the present invention further includes an oil slurry inlet pipeline and a filtered oil outlet pipeline respectively in communication with each filter. In an embodiment of the present invention, the oil slurry filter unit of the present invention further includes an oil slurry inlet pipeline, a filtered oil outlet pipeline, and a filter residue discharge pipeline respectively in communication with each filter. In an embodiment of the present invention, the oil slurry inlet pipeline, the filtered oil outlet pipeline, and the filter residue discharge pipeline as required are respectively connected with the oil slurry inlet, the filtered oil outlet and the filter residue outlet (as required) provided in the above-mentioned filter of the present invention.

In an embodiment of the present invention, the oil slurry filter unit of the present invention further includes a purge medium inlet pipeline, said purge medium inlet pipeline is respectively in communication with each filter. In an embodiment of the present invention, the purge medium inlet pipeline is connected with the purge medium inlet provided in the above-mentioned filter of the present invention. In an embodiment of the present invention, the oil slurry filter unit of the present invention further includes a purge medium buffer tank, and the outlet of the purge medium buffer tank is in communication with the purge medium inlet of each filter through the purge medium inlet pipeline.

In an embodiment of the present invention, the purge medium buffer tank is filled with a purge medium known in the art that can be used for the blowback of the filter residue. In an embodiment of the present invention, in the oil slurry filtering process of the present invention, the purge medium may be inert gas and/or flushing oil. The inert gas is a gas that does not react with the oil slurry and particles in the filter system, and is preferably nitrogen gas. In an embodiment of the present invention, the purge medium is a fuel gas. In an embodiment of the present invention, the flushing oil is a filtered oil, preferably a filtered oil obtained by the treatment with the oil slurry filtering process of the present invention.

In an embodiment of the present invention, the oil slurry filter unit of the present invention further includes a filter aid buffer tank, and the outlet of the filter aid buffer tank is in communication with the filter aid inlet of each filter. In an embodiment of the present invention, the outlet of the filter aid buffer tank is in communication with the filter aid inlet of each filter through the filter aid inlet pipeline. In an embodiment of the present invention, when the oil slurry inlet is used as the filter aid inlet, the outlet of the filter aid buffer tank is in communication with the oil slurry inlet of the filter through the filter aid inlet pipeline. In an embodiment of the present invention, the outlet of the filter aid buffer tank is in communication with the oil slurry inlet of the filter through the oil slurry inlet pipeline.

In an embodiment of the present invention, a stirring component is provided in the filter aid buffer tank. There is no restriction on the specific form of the stirring component, and any stirring component capable of uniformly mixing the filter aid and the mixing medium is included in the scope of the present invention. In an embodiment of the present invention, the stirring member is a rotatable blade component.

In an embodiment of the present invention, the filter aid buffer tank is filled with a filter aid and a mixed medium. In an embodiment of the present invention, said filter aid is selected from diatomite, cellulose, perlite, talcum powder, activated clay, filter residue obtained from a filter, spent catalytic cracking catalysts or mixtures thereof. The mixing medium is not limited in any way, as long as it does not adversely affect the filter system, does not dissolve the filter aid, and can help said filter aid form into a medium in a slurry state. In an embodiment of the present invention, said mixing medium is a liquid hydrocarbon, further preferably a filtered oil.

In an embodiment of the present invention, the filter aid buffer tank includes a mixing medium inlet. In an embodiment of the present invention, the mixed medium inlet of the filter aid buffer tank is in communication with the filtered oil outlet of the filter. In this case, the communication between the mixing medium inlet and the filtered oil outlet includes the direct communication and the indirect communication. The case of direct communication means that the mixed medium inlet and the filtered oil outlet are directly connected through a pipeline, and the case of indirect communication means that on the pipeline between the mixed medium inlet and the filtered oil outlet is provided a device commonly used in the art such as a filtered oil collecting device and a filtered oil further processing device.

Multiple-Filter System

The present invention provides a multiple-filter system for the oil slurry filtering, which includes a filter system and a control system;

the filter system includes the above-mentioned oil slurry filter unit of the present invention, and the filter unit includes at least two aforementioned oil slurry filters of the present invention;

said control system includes an online pressure difference monitoring module, a filter control module and a purge control module, said online pressure difference monitoring module is used to monitor the pressure difference of the filter used online, said filter control module is used to control the filter to switch on and switch off the filter system, and said purge control module is used to control the blowback process of the filter.

As described above, in the multiple-filter system of the present invention, the filter unit in the filter system includes at least two aforementioned filters of the present invention. In an embodiment of the present invention, the filter unit includes 3, 4, 5, 6 or more aforementioned filters of the present invention.

In an embodiment of the present invention, in the multiple-filter system of the present invention, the filter unit includes an oil slurry inlet pipeline, a filtered oil outlet pipeline, a purge medium inlet pipeline and a filter residue discharge pipeline respectively in communication with each filter, the filter includes an oil slurry inlet connected to the oil slurry inlet pipeline, a filtered oil outlet connected to the filtered oil outlet pipeline, a purge medium inlet connected to the purge medium inlet pipeline and a filter residue outlet connected to the filter residue discharge pipeline.

In the multiple-filter system of the present invention, there is no limitation on the connection manner of two or more aforementioned filters of the present invention. In an embodiment of the present invention, two or more filters can be arranged in parallel. In an embodiment of the present invention, two or more filters can be arranged in series. In an embodiment of the present invention, two or more filters can be used by the switching between in parallel and in series. In an embodiment of the present invention, when the number of filters is more than 2, the filters can be arranged in the mixing of in parallel and in series. When two or more filters are included, the two or more filters can be filters with the same filtering precision, or filters with inconsistent filtering precision, or filters with partly consistent and partly inconsistent filtering precisions. The filtering precision of the filter system including two or more filters of the present invention is the filtering precision of the whole filter system itself. That is, it is the size of the largest particle that can be allowed to pass through the filter system when the solution containing impurities passes through the filter system.

In an embodiment of the present invention, said online pressure difference monitoring module includes pressure gauge(s) or differential-pressure gauge(s) provided on the oil slurry inlet pipeline and the filtered oil outlet pipeline of each filter. In an embodiment of the present invention, said filter control module includes control valve(s) provided on the oil slurry inlet pipeline, the filtered oil outlet pipeline and the filter residue discharge pipeline of each filter. In an embodiment of the present invention, said purge control module includes control valve(s) provided on the purge medium inlet pipeline of each filter.

The filter unit in the multiple-filter system of the present invention may further include a purge medium buffer tank, and the outlet of the purge medium buffer tank is in communication with the purge medium inlet of each filter through the purge medium inlet pipeline. The purge medium in the multiple-filter system of the present invention is consistent with the purge medium as described above.

The filter unit in the multiple-filter system of the present invention can further include a filter aid buffer tank, the outlet of the filter aid buffer tank is in communication with the filter aid inlet of each filter. In an embodiment of the present invention, when the oil slurry inlet is used as the filter aid inlet, the outlet of the filter aid buffer tank is in communication with the oil slurry inlet of the filter through the filter aid inlet pipeline. In an embodiment of the present invention, the outlet of the filter aid buffer tank is in communication with the oil slurry inlet of the filter through the oil slurry inlet pipeline.

When the multiple-filter system of the present invention includes the filter aid buffer tank, the description of the filter aid and the filter aid buffer tank is consistent with the above.

Multiple-Stage Filter System

The present invention provides a multiple-stage filter system for the oil slurry filtering, which includes a primary filter unit and a secondary filter unit and/or a tertiary filter unit;

said primary filter unit includes a first filter system, said first filter system includes the aforementioned oil slurry filter unit of the present invention, said filter unit includes at least one aforementioned oil slurry filter of the present invention;

said secondary filter unit includes an automatic backwashing filter device having a driving means;

said tertiary filter unit includes a second filter system, said second filter system includes at least one filter;

the filtering precision of said secondary filter unit is less than the filtering precision of the primary filter unit, the filtering precision of said tertiary filter unit is less than the filtering precision of the primary filter unit and less than the filtering precision of said secondary filter unit;

the filtered oil outlet of said primary filter unit is in communication with the inlet of said secondary filter unit and/or the inlet of said tertiary filter unit respectively.

The filtering precision of the primary filter unit of the present invention is the filtering precision of the whole primary filter unit itself; the filtering precision of the secondary filter unit of the present invention is the filtering precision of the whole secondary filter unit itself; the filtering precision of the tertiary filter unit of the present invention is the filtering precision of the whole tertiary filter unit itself. That is, it is the size of the largest particle that can be allowed to pass through each stage of filter units when the solution containing impurities passes through each stage of filter units.

In an embodiment of the present invention, the multiple-stage oil slurry filter system of the present invention includes a primary filter unit and a secondary filter unit, here, the filtered oil outlet of the primary filter unit is in communication with the inlet of the secondary filter unit.

In an embodiment of the present invention, the multiple-stage oil slurry filter system of the present invention includes a primary filter unit and a tertiary filter unit, here, the filtered oil outlet of the primary filter unit is in communication with the inlet of the tertiary filter unit.

In an embodiment of the present invention, the multiple-stage oil slurry filter system of the present invention includes a primary filter unit, a secondary filter unit and a tertiary filter unit, here, the filtered oil outlet of the primary filter unit is in communication with the inlet of the secondary filter unit and the inlet of the tertiary filter unit respectively. In an embodiment of the present invention, when the multiple-stage oil slurry filter system of the present invention includes a primary filter unit, a secondary filter unit and a tertiary filter unit, the filtered oil outlet of the secondary filter unit is in communication with the inlet of the tertiary filter unit.

In an embodiment of the present invention, the multiple-stage oil slurry filter system of the present invention includes a primary filter unit, a secondary filter unit and a tertiary filter unit, here, the filtered oil outlet of the primary filter unit is in communication with the inlet of the secondary filter unit, the filtered oil outlet of the secondary filter unit is in communication with the inlet of the tertiary filter unit.

In an embodiment of the present invention, in the first filter system of the multiple-stage filter system of the present invention, said filter unit further includes an oil slurry inlet pipeline, and a filtered oil outlet pipeline respectively in communication with each filter. In an embodiment of the present invention, in the first filter system of the multiple-stage filter system of the present invention, said filter unit further includes an oil slurry inlet pipeline, a filtered oil outlet pipeline and a filter residue discharge pipeline respectively in communication with each filter. In the first filter system of the multiple-stage filter system of the present invention, the filter includes an oil slurry inlet connected to the oil slurry inlet pipeline, a filtered oil outlet connected to the filtered oil outlet pipeline, and (as required) a filter residue outlet connected to the filter residue discharge pipeline.

In an embodiment of the present invention, in the first filter system of the multiple-stage filter system of the present invention, said filter unit further includes an oil slurry inlet pipeline, a filtered oil outlet pipeline, a purge medium inlet pipeline and a filter residue discharge pipeline respectively in communication with each filter; the filter includes an oil slurry inlet connected to the oil slurry inlet pipeline, a filtered oil outlet connected to the filtered oil outlet pipeline, a purge medium inlet connected to the purge medium inlet pipeline and a filter residue outlet connected to the filter residue discharge pipeline.

In an embodiment of the present invention, in the first filter system of the multiple-stage filter system of the present invention, said filter unit can further include a purge medium buffer tank, the outlet of the purge medium buffer tank is in communication with the purge medium inlet of each filter through the purge medium inlet pipeline. The description of the purge medium in the multiple-stage filter system of the present invention is consistent with the above.

In an embodiment of the present invention, in the first filter system of the multiple-stage filter system of the present invention, said filter unit can further include a filter aid buffer tank, the outlet of the filter aid buffer tank is in communication with the filter aid inlet of each filter. In an embodiment of the present invention, the oil slurry inlet of the filter can be used as the filter aid inlet, here the outlet of the filter aid buffer tank is in communication with the oil slurry inlet of the filter through the filter aid inlet pipeline. In an embodiment of the present invention, the outlet of the filter aid buffer tank is in communication with the oil slurry inlet of the filter through the oil slurry inlet pipeline.

In the first filter system of the multiple-stage filter system of the present invention can include one aforementioned filter of the present invention, or can include two or more aforementioned filters of the present invention. In case of including two or more aforementioned filters of the present invention, there is no limitation on the connection manner of two or more filters. In an embodiment of the present invention, two or more filters can be arranged in parallel. In an embodiment of the present invention, two or more filters can be arranged in series. In an embodiment of the present invention, two or more filters can be used by the switching between in parallel and in series. In an embodiment of the present invention, when the number of filters is more than 2, the filters can be arranged in the mixing of in parallel and in series. When two or more filters are included, the two or more filters can be filters with the same filtering precision, or filters with inconsistent filtering precision, or filters with partly consistent and partly inconsistent filtering precisions.

In one embodiment of the multiple-stage filter system of the present invention, the filtering precision of the primary filter unit is 0.1-25 micrometers, preferably 0.1-15 micrometers, further preferably 0.1-10 micrometers. In an embodiment of the present invention, the filtering precision of said primary filter unit is 2-25 micrometers. In an embodiment of the present invention, the filtering precision of said primary filter unit is 2-15 micrometers, further preferably 2-10 micrometers. In addition, in an embodiment of the present invention, the filtering precision of said primary filter unit can be 0.1 to less than 2 micrometers.

In an embodiment of the present invention, the secondary filter unit of the multiple-stage oil slurry filter system of the present invention includes an automatic backwashing filter device having a driving means. The automatic backwashing filter device may be an automatic backwashing filter device having a driving means well known in the art. In an embodiment of the present invention, the filter device includes a cylindrical shell, a cylindrical filter screen, a residue unloading means, a flushing oil inlet, and a filter residue outlet, said residue unloading means is arranged inside the cylindrical filter screen and connected with a driving means. In an embodiment of the present invention, the filter device can automatically perform the backwashing of the filter screen by monitoring the pressure difference. Specifically, when the backwashing is started, the residue unloading means located inside the filter screen is driven to rotate by a motor, and the inside of the rotating residue unloading means is in communication with the external low-pressure tank through a pipeline, and the flushing oil is sent to a low-pressure area of the residue unloading means through the local-contacting site between the residue unloading means and the filter screen to backwash the filter screen with flushing oil. Since the residue unloading means is rotating, the backwashing and regeneration of the whole filter screen are completed once per its revolution.

In the present invention, there is no limitation on the material of the filter screen of the filter device in the secondary filter unit, and materials known in the art that can be used as filter screen can be used. As the material of the filter screen, it can be at least one material selected from polypropylene, polyethylene, nylon, polyester fiber, polypropylene fiber, polyphenylene sulfide, polyimide, polytetrafluoroethylene, aramid fiber, polyurethane, and glass fiber. In the present invention, the filtering precision of said secondary filter unit is less than the filtering precision of the primary filter unit. In an embodiment of the present invention, the filtering precision of said secondary filter unit is 0.1-7 micrometers, preferably 1-5 micrometer.

In an embodiment of the present invention, the filter area of said secondary filter unit is one-twentieth to one-tenth of the filter area of the primary filter unit.

In the multiple-stage filter system of the present invention, said tertiary filter unit includes a second filter system, said second filter system includes at least one filter. In the multiple-stage filter system of the present invention, filters known in the art can be used as the filter in said tertiary filter unit, as long as the filtering precision of the tertiary filter unit is less than the filtering precision of the primary filter unit and less than the filtering precision of the secondary filter unit. In an embodiment of the present invention, as the raw material that can be made into the material of the filter screen of the filter in said tertiary filter unit, it can be at least one material selected from polypropylene, polyethylene, nylon, polyamide fiber, polyester fiber, polypropylene fiber, polyphenylene sulfide, polyimide, polytetrafluoroethylene, aramid fiber, polyurethane, glass fiber, and vinylon.

In an embodiment of the present invention, the filter screen of the filter in said tertiary filter unit has a porosity of 85%-98%. In an embodiment of the present invention, the filter screen of the filter in said tertiary filter unit has a basis weight of 300-1000 g/m$^2$. In an embodiment of the present invention, the filter screen of the filter in said tertiary filter unit has a thickness of 0.5-3.0 mm. In an embodiment of the present invention, the filter in said tertiary filter unit has a warp-direction breaking strength of 1000 N/5 cm-9000 N/5 cm, a weft-direction breaking strength of 1000 N/5 cm-11000 N/5 cm. In an embodiment of the present invention, the filter in said tertiary filter unit is the aforementioned oil slurry filter of the present invention.

In the multiple-stage filter system of the present invention, the filtering precision of said tertiary filter unit is less than the filtering precision of said primary filter unit and less than the filtering precision of the secondary filter unit. In an embodiment of the present invention, the filtering precision of said tertiary filter unit is 0.1-1.0 micrometer.

In an embodiment of the present invention, the filter area of the filter in said tertiary filter unit is greater than the filter area of the filter in said primary filter unit. In an embodiment of the present invention, the filter area of said tertiary filter unit is 1.5-20 times the filter area of the primary filter unit.

Oil Slurry Filtering Process

The present invention also provides an oil slurry filtering process, which comprises: allowing an oil slurry to be sent to the aforementioned oil slurry filter of the present invention to carry out the filtering (filtering step).

In an embodiment of the present invention, in the oil slurry filtering process of the present invention, the oil slurry is sent to the filter through the oil slurry inlet pipeline, and the filtered oil is taken out from the filtered oil outlet pipeline.

In the present invention, the oil slurry is a liquid hydrocarbon containing particle impurities, and preferably the oil slurry is a liquid hydrocarbon containing catalytic cracking oil slurry and/or coal tar.

In an embodiment of the present invention, in the filtering step, the filtering temperature in the filter is 30-250° C., more preferably 50-240° C., further preferably 60-180° C.

In an embodiment of the present invention, in the filtering step, the pressure difference used for the filter (the pressure difference when the collection of the filtered oil is started) is 0.01-0.5 MPa. The lower limit for the used pressure difference can be 0.02 MPa or 0.04 MPa; and the upper limit for the used pressure difference can be 0.4 MPa or 0.30 MPa. When the pressure difference is lower than 0.01 MPa, the filtered oil slurry cannot form an effective filter cake on the filter material, and an excellent filtering effect cannot be achieved. On the other hand, when the pressure difference is higher than 0.5 MPa, it will cause damage to the flexible filter material, resulting in a decreased efficiency of the flexible filter material in the subsequent filtering and a shortened service life.

In an embodiment of the present invention, in the oil slurry filtering process of the present invention, the used filter is subjected to the blowback with purge medium. In an embodiment of the present invention, in the oil slurry filtering process of the present invention, the purge medium is sent to the filter through the purge medium inlet pipeline to perform the blowback (blowback step).

In an embodiment of the present invention, in the oil slurry filtering process of the present invention, the filtered filter residue is discharged from the filter residue discharge pipeline.

In the oil slurry filtering process of the present invention, the purge medium is a purge medium well known in the art that can be used for the blowback of the filter residue. In an embodiment of the present invention, in the oil slurry filtering process of the present invention, the purge medium may be inert gas and/or flushing oil. The inert gas is a gas that does not react with the oil slurry and particles in the filter system, and is preferably nitrogen gas. In an embodiment of the present invention, the purge medium is a fuel gas. In an embodiment of the present invention, the flushing oil is a filtered oil, preferably a filtered oil obtained by the treatment with the oil slurry filtering process of the present invention. In the present invention, the blowback actually refers to the back-purge and back-elution, and its purpose is to remove the filter residue in the filter by the purge medium.

In an embodiment of the present invention, in the oil slurry filtering process of the present invention, before the oil slurry is sent to the oil slurry filter, the filter aid is sent to the filter to form a filter cake layer of the filter aid on the filter component of the filter (filter cake layer formation step), and then the oil slurry is filtered. The description of the filter aid and the filter cake layer of the filter aid is consistent with the aforementioned description of the filter aid and the filter cake layer of the filter aid of the present invention. The description of the formation step of the filter cake layer of the filter aid is consistent with the aforementioned description of the formation step of the filter cake layer of the filter aid of the present invention. In an embodiment of the present invention, in the filter cake layer formation step, the filter cake layer formed from the filter aid has a thickness of 0.1-10 mm. In an embodiment of the present invention, after the filter cake layer formed from a filter aid is formed on said filter component, the pressure difference of the filter is 0.01-0.07 MPa. When the pressure difference is lower than 0.01 MPa, an effective filter cake of the filter aid cannot be formed on the filter material, and the excellent filtering effect cannot be achieved or the service life of the filter cannot be prolonged, when the pressure difference is greater than 0.07 MPa, for the pressure difference used for the filter, the reserved pressure difference rising space is reduced, resulting in the reduced effective time for the filtering of the oil slurry. In an embodiment of the present invention, said filter aid is selected from diatomite, cellulose, perlite, talcum powder, activated clay, filter residue obtained from a filter, spent catalytic cracking catalysts or mixtures thereof. In an embodiment of the present invention, in the oil slurry filtering process of the present invention, when the filter cake layer of the filter aid is formed, the thickness of the filter cake layer of the filter aid is controlled by monitoring the pressure difference of the filter. In an embodiment of the present invention, in the oil slurry filtering process of the present invention, at least a part of the filtered oil is returned to the filter aid buffer tank.

In an embodiment of the present invention, before forming the filter cake layer of the filter aid on the filter component of the filter, the filtered oil outlet pipeline of the filter is in communication with a raw material buffer tank, or in communication with an unqualified filtered oil pipeline.

In an embodiment of the present invention, in the filter cake layer formation step, the temperature of the filter is 30-250° C., preferably 50-180° C.

In an embodiment of the present invention, in the filter cake layer forming step, the filter aid is sent to the filter through the filter aid inlet pipeline. In an embodiment of the present invention, in the filter cake layer forming step, the filter aid is sent to the filter through the oil slurry inlet pipeline.

In an embodiment of the present invention, in the filter cake layer formation step, firstly, the filter aid and the mixing medium are fully mixed in the filter aid buffer tank, and then the mixture is sent to the filter. In the filtering process of the present invention, the mixing medium is not limited in any way, as long as it does not adversely affect the filter system, does not dissolve the filter aid, and can help said filter aid form into a medium in a slurry state. In an embodiment of the present invention, said mixing medium is a liquid hydrocarbon, further preferably filtered oil.

In an embodiment of the present invention, in the oil slurry filtering process of the present invention, at least a part of the filtered oil is returned to the filter aid buffer tank.

In an embodiment of the present invention, in the oil slurry filtering process of the present invention, one aforementioned filter of the present invention can be used. In an embodiment of the present invention, in the oil slurry filtering process of the present invention, two or more aforementioned filters of the present invention can be used.

In an embodiment of the present invention, in the oil slurry filtering process of the present invention, when one filter is used, the operation can be performed in a way that the filtering mode and the purge mode are alternately performed. In an embodiment of the present invention, in the oil slurry filtering process of the present invention, when two or more filters are used, the operation can be performed in a way that the online filter and the backup filter are alternately switched. Specifically, when the pressure difference of the online filter reaches or is higher than a set value, the backup filter can be switched on the filter system, and the online filter is switched off the filter system and subjected to the blowback and the residue unloading, and as required, a filter aid is introduced to form a filter cake layer of filter aid.

The filter residue discharged in the form of a liquid mixture has good fluidity and can be discharged from the filter system. The filter residue can also be stabilized and dried in the filter, and then discharged from the filter system in the form of a completely solidified filter residue.

The present invention also provides an oil slurry filtering process, which uses the aforementioned multiple-filter system of the present invention, and which comprises:

(1) allow an oil slurry to be sent to a part of the filters of at least two aforementioned oil slurry filters according to the present invention in the filter system (filtering step);

(2) in the control system, allowing the online pressure difference monitoring module to monitor the pressure difference of the online filter, allowing the filter control module to control the filter to switch on and switch off the filter system, and allowing the purge control module to control the blowback process of the filter (control step); and (3) using a purge medium to blowback the filter that is switched off the filter system (blowback step), wherein when the online pressure difference monitoring module monitors that the pressure difference of the online filter reaches a set value I, the other parts of the filters of the aforementioned filters are switched on the filter system through the filter control module and used in the aforementioned filtration step, and the online filter of which the pressure difference reaches the set value I is switched off the filter system, said set value I is in a range of 0.01-5 MPa, the filter that is switched off the filter system is subjected to the residue unloading and the blowback with a purge medium through the purge control module.

In an embodiment of the present invention, in the online filter, the filtration temperature is 30-250° C., preferably 50-240° C., further preferably 60-180° C.

In an embodiment of the present invention, when the online pressure difference monitoring module monitors that the pressure difference of the online filter reaches a set value II, the other parts of filters of the filters are switched on the filter system through the filter control module and used in the filtration step, when the online pressure difference monitoring module monitors that the pressure difference of the online filter that is subsequently switched-on reaches a set value III, the online filter of which the pressure difference reaches or exceeds the set value II is switched off the filter system; provided with that set value III<set value II<set value I; and the set volume II and the set value III are in the range of 0.01 to 5 MPa.

In an embodiment of the present invention, the pressure difference used for the online filter is 0.01-0.5 MPa. The lower limit for the used pressure difference can be 0.02 MPa or 0.04 MPa; and the upper limit for the used pressure difference can be 0.4 MPa or 0.30 MPa. The pressure difference set value I monitored by the online pressure difference monitoring module is in the range of the used pressure difference, when the pressure difference is lower than 0.01 MPa, the filtered oil slurry cannot form an effective filter cake on the filter material, and an excellent filtering effect cannot be achieved. On the other hand, when the pressure difference is higher than 0.5 MPa, it will cause damage to the flexible filter material, resulting in a decreased efficiency of the flexible filter material in the subsequent filtering and a shortened service life, and accordingly it is necessary to switch the online filter off the filter system.

The present invention also provides an oil slurry filtering process, which uses the aforementioned multiple-filter system of the present invention, wherein before (1) filtering step, said process further comprises:

(1') allowing the filter aid to be sent to a part of the filters of at least two aforementioned oil slurry filters according to the present invention in the filter system to form a filter cake layer of the filter aid in the filter (filter cake layer formation step);

in the filtration step, the oil slurry is sent to the filter in which the filter cake layer of the filter aid has been formed (filtration step);

when the online pressure difference monitoring module monitors that the pressure difference of the filter in the filter cake layer formation step reaches a set value IV, the filter in which the filter cake layer is formed is switched on the filtration step through the filter control module to carry out the oil slurry filtering, said set value IV is in the range of 0.01 to 0.07 MPa.

In an embodiment of the present invention, in the filtering process by using the multiple-filter system of the present invention, after switching the filter on the filter system, before forming the filter cake layer of the filter aid on the filter component of the filter, through the filter control module, the filtered oil outlet pipeline of the filter is in communication with a raw material buffer tank, or in communication with an unqualified filtered oil pipeline. The description of the filter aid and the filter cake layer of the filter aid is consistent with the aforementioned description of the filter aid and the filter cake layer of the filter aid of the present invention. The description of the formation step of the filter cake layer of the filter aid is consistent with the aforementioned description of the formation step of the filter cake layer of the filter aid of the present invention. In an embodiment of the present invention, in the filter cake layer formation step, the set value IV of the pressure difference of the filter is in the range of 0.01-0.07 MPa, when the pressure difference is lower than 0.01 MPa, an effective filter cake of the filter aid cannot be formed on the filter material, and the excellent filtering effect cannot be achieved or the service life of the filter cannot be prolonged, when the pressure difference is greater than 0.07 MPa, for the pressure difference used for the filter, the reserved pressure difference rising space is reduced, resulting in the reduced effective time for the filtering of the oil slurry. In an embodiment of the present invention, said filter aid is selected from diatomite, cellulose, perlite, talcum powder, activated clay, filter residue obtained from a filter, spent catalytic cracking catalysts or mixtures thereof. In an embodiment of the present invention, in the oil slurry filtering process of the present invention, when the filter cake layer of the filter aid is formed, the thickness of the filter cake layer of the filter aid is controlled by monitoring the pressure difference of the filter. In an embodiment of the present invention, in the filtering process by using the multiple-filter system of the present invention, at least a part of the filtered oil is returned to the filter aid buffer tank.

The present invention also provides an oil slurry filtering process, which uses the aforementioned multiple-stage filter system of the present invention, and which comprises:

a step of allowing an oil slurry to be sent to a primary filter unit and filtered to obtain a primary filtered oil slurry (primary filtering step), said primary filter unit includes a first filter system, said first filter system includes the aforementioned oil slurry filter unit of the present invention, said filter unit includes at least one aforementioned oil slurry filter of the present invention; and allowing the primary filtered oil slurry to be sent to a secondary filter unit and/or a tertiary filter unit and filtered;

said secondary filter unit includes an automatic backwashing filter device having a driving means;

said tertiary filter unit includes a second filter system, said second filter system includes at least one filter;

the filtering precision of said secondary filter unit is less than the filtering precision of the filter in the primary filter unit, and the filtering precision of said tertiary filter unit is less than the filtering precision of the primary filter unit and less than the filtering precision of the secondary filter unit.

In the filtering process by using the multiple-stage filter system of the present invention, the description of the multiple-stage filter system is consistent with the description of the aforementioned multiple-stage filter system.

In an embodiment of the present invention, the primary filtered oil slurry is sent to the secondary filter unit to obtain a filtered oil (secondary filtering step). In an embodiment of the present invention, the primary filtered oil slurry is sent to the tertiary filter unit to obtain a filtered oil (tertiary filtering step). In an embodiment of the present invention, the primary filtered oil slurry is sent to the secondary filter unit to obtain a secondary filtered oil slurry, then the secondary filtered oil slurry is sent to the tertiary filter unit to obtain a filtered oil (tertiary filtering step).

In the filtering process by using the multiple-stage filter system of the present invention, the step of allowing an oil slurry to be sent to the primary filter unit and filtered to obtain a primary filtered oil slurry can be identical to the aforementioned filtering step of the present invention.

In an embodiment of the present invention, the filtering temperature of the filter in the first filter system is 30-250° C., preferably 50-240° C., more preferably 60-180° C.

In an embodiment of the present invention, the pressure difference used for the filter in the first filter system is 0.01-0.5 MPa. The lower limit for the used pressure difference can be 0.02 MPa or 0.04 MPa; and the upper limit for the used pressure difference can be 0.4 MPa or 0.30 MPa. When the pressure difference is lower than 0.01 MPa, the filtered oil slurry cannot form an effective filter cake on the filter material, and an excellent filtering effect cannot be achieved. On the other hand, when the used pressure difference is higher than 0.5 MPa, it will cause damage to the flexible filter material, resulting in a decreased efficiency of the flexible filter material in the subsequent filtering and a shortened service life.

In an embodiment of the present invention, in the filtering process by using the multiple-stage filter system of the present invention, the filtering temperature of the filter in the second filter system is 30-250° C., preferably 60-180° C.

In an embodiment of the present invention, in the filtering process by using the multiple-stage filter system of the present invention, the filter in the second filter system is not subjected to the blowback. In an embodiment of the present invention, the filtering mode of inside-in and outside-out is used in the filter in the second filter system, and the impurities are completely placed inside the filter.

In an embodiment of the present invention, in the filtering process by using the multiple-stage filter system of the present invention, before the primary filtration step, the filter aid is sent to the filter to form a filter cake layer of the filter aid on the filter component of the filter (filter cake layer formation step), and then the primary filtration step is performed. The description of the filter aid and the filter cake layer of the filter aid is consistent with the aforementioned description of the filter aid and the filter cake layer of the filter aid of the present invention. The description of the formation step and condition of the filter cake layer of the filter aid is consistent with the aforementioned description of the formation step and condition of the filter cake layer of the filter aid of the present invention. In an embodiment of the present invention, in the filter cake layer formation step, the set value of the pressure difference of the filter is 0.01-0.07 MPa, when the pressure difference is lower than 0.01 MPa, an effective filter cake of the filter aid cannot be formed on the filter material, and the excellent filtering effect cannot be achieved or the service life of the filter cannot be prolonged, when the pressure difference is greater than 0.07 MPa, for the pressure difference used for the filter, the reserved pressure difference rising space is reduced, resulting in the reduced effective time for the filtering of the oil slurry. In an embodiment of the present invention, said filter aid is selected from diatomite, cellulose, perlite, talcum powder, activated clay, filter residue obtained from a filter, spent catalytic cracking catalysts or mixtures thereof. In an embodiment of the present invention, in the oil slurry filtering process of the present invention, when the filter cake layer of the filter aid is formed, the thickness of the filter cake layer of the filter aid is controlled by monitoring the pressure difference of the filter. In an embodiment of the present invention, in the filtering process by using the multiple-stage filter system of the present invention, at least a part of the filtered oil is returned to the filter aid buffer tank.

The present invention will be further described below in conjunction with the accompanying drawings, but these drawings are only for explaining the present invention more specifically, and the embodiments of the present invention are not limited thereto.

FIG. 1 is a schematic diagram of an embodiment of the oil slurry filter unit of the present invention. As shown in FIG. 1, the oil slurry filter unit includes an oil slurry filter 11, and an oil slurry inlet pipeline 13, a filtered oil outlet pipeline 14 and a filter residue discharge pipeline 15 in communication with with filter 11. The filter 11 is provided with a filter component of flexible texture 12 (flexible filter bag). An oil slurry inlet is provided at the lower part of the filter 11, a filtered oil outlet is provided at the upper part of the filter 11, and a filter residue outlet is provided at the bottom of the filter 11. Purge medium inlets are provided at the top and the upper part of the filter 11, and are in communication with the purge medium inlet pipeline 16.

Figure 2:
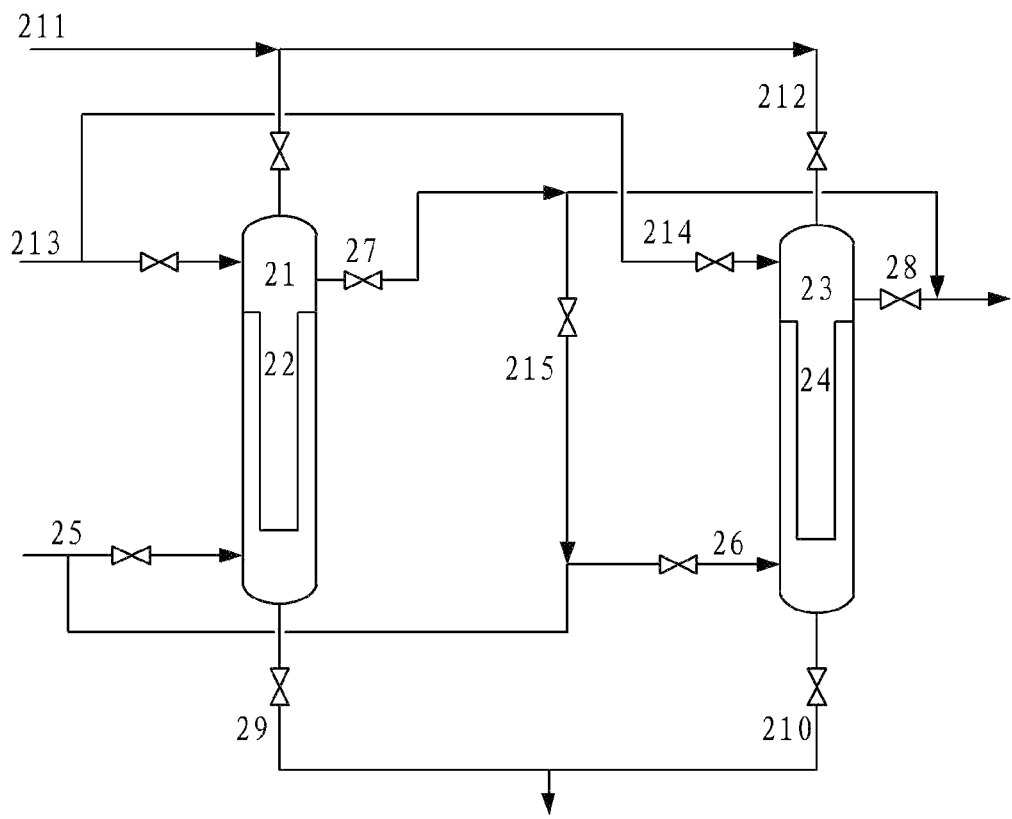
FIG. 2 is a schematic diagram of another embodiment of the oil slurry filter unit of the present invention.

FIG. 2 is a schematic diagram of another embodiment of the oil slurry filter unit of the present invention. As shown in FIG. 2, the oil slurry filter unit includes an oil slurry filter 21 and an oil slurry filter 23, an oil slurry inlet pipeline 25, a filtered oil outlet pipeline 27, and a filter residue discharge pipeline 29 in communication with the filter 21; an oil slurry inlet pipeline 26, a filtered oil outlet pipeline 28, and a filter residue discharge pipeline 210 in communication with the filter 23. The filter 21 is provided with a filter component of flexible texture 22 (flexible filter bag); and the filter 23 is provided with a filter component of flexible texture 24 (flexible filter bag). A purge medium inlet is provided at the top of the filter 21, and is in communication with the purge medium inlet pipeline 211; and a purge medium inlet is provided at the upper part of the filter 21, and is in communication with the purge medium inlet pipeline 213. A purge medium inlet is provided at the top of the filter 23, and is in communication with the purge medium inlet pipeline 212; and a purge medium inlet is provided at the upper part of the filter 23, and is in communication with the purge medium inlet pipeline 214. A communication pipeline 215 is provided between the filtered oil outlet of the filter 21 and the oil slurry inlet of the filter 23.

When the filter system shown in FIG. 2 is used for filtering, the filter 21 and the filter 23 can be used in parallel, can be used in series, or can be switched in use. Upon being switched in use, when the filter 21 is in the state of online filtering, the filter 23 is subjected to the blowback or in the backup state at the same time; or when the filter 23 is in the state of online filtering, the filter 21 is subjected to the blowback or in the backup state at the same time.

Figure 3:
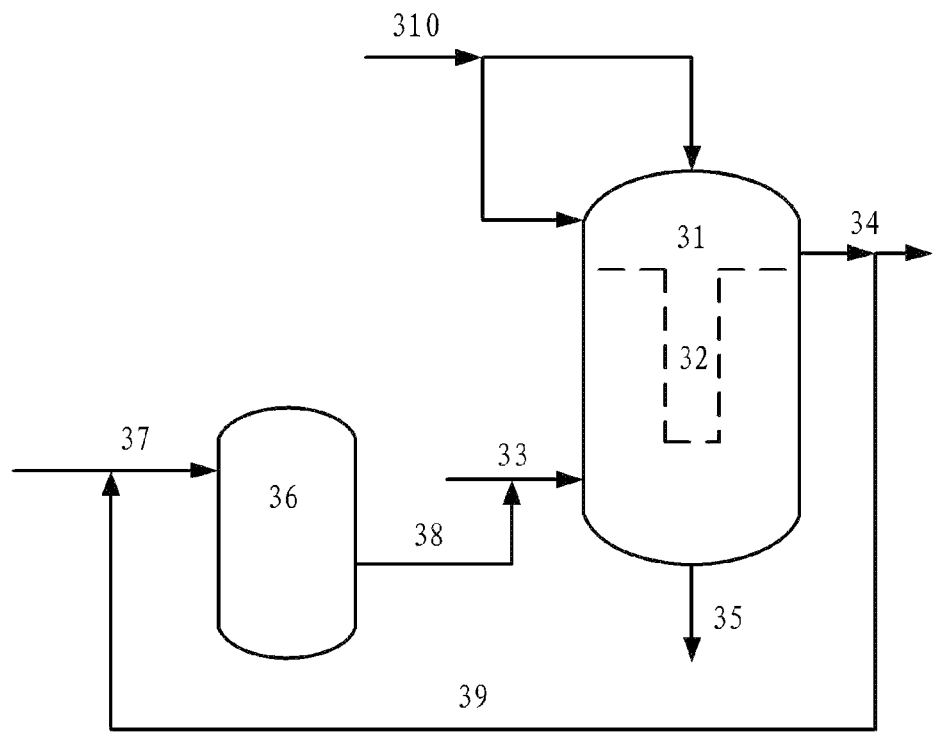
FIG. 3 is a schematic diagram of another embodiment of the oil slurry filter unit of the present invention.

FIG. 3 is a schematic diagram of another embodiment of the oil slurry filter unit of the present invention. As shown in FIG. 3, the oil slurry filter unit includes an oil slurry filter 31 and a filter aid buffer tank 36, and an oil slurry inlet pipeline 33, a filtered oil outlet pipeline 34, and a filter residue discharge pipeline 35 in communication with the filter 31, the outlet of filter aid buffer tank 36 is in communication with the oil slurry inlet pipeline 38 of the filter. Purge medium inlets are provided at the top and the upper part of the filter 31, and are in communication with the purge medium inlet pipeline 310. The mixing medium inlet of the filter aid buffer tank 36 is in communication with the inlet pipeline 37, the mixing medium inlet of the filter aid buffer tank 36 is in communication with the filtered oil outlet pipeline of the filter via the pipeline 39.

Figure 4:
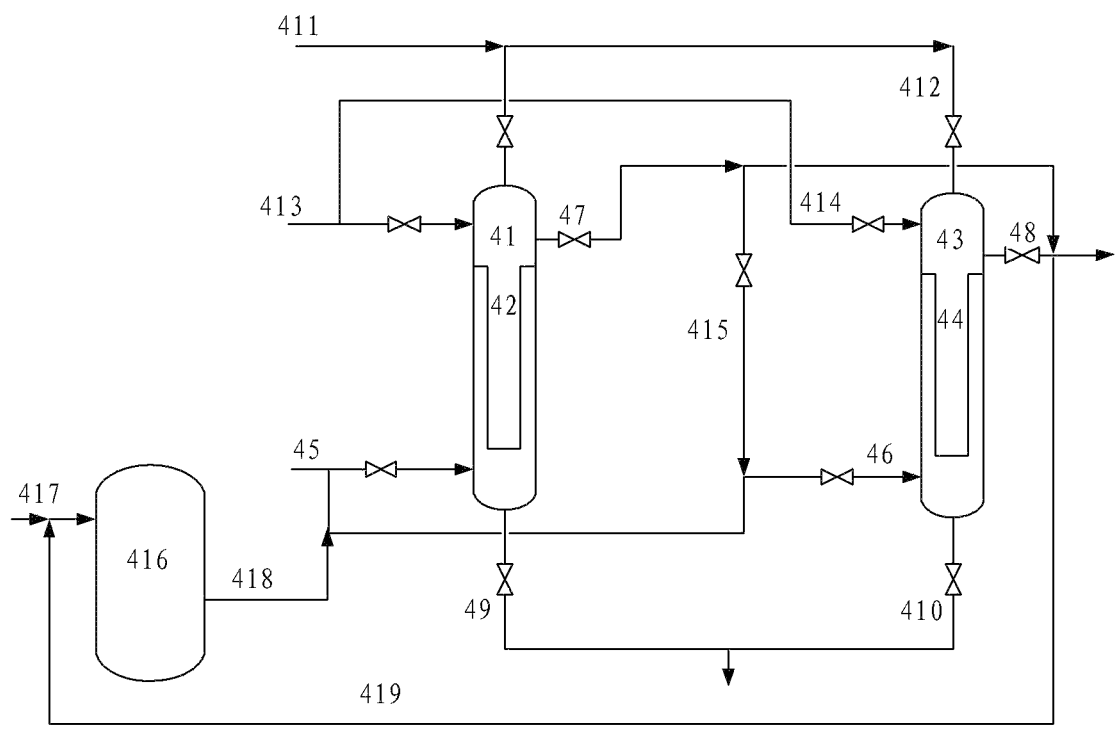
FIG. 4 is a schematic diagram of another embodiment of the oil slurry filter unit of the present invention.

FIG. 4 is a schematic diagram of another embodiment of the oil slurry filter unit of the present invention. As shown in FIG. 4, the oil slurry filter unit includes an oil slurry filter 41, an oil slurry filter 43 and a filter aid buffer tank 416, and an oil slurry inlet pipeline 45, a filtered oil outlet pipeline 47 and a filter residue discharge pipeline 49 in communication with the filter 41; and an oil slurry inlet pipeline 46, a filtered oil outlet pipeline 48, and a filter residue discharge pipeline 410 in communication with the filter 43. A purge medium inlet is provided at the top of the filter 41, and is in communication with the purge medium inlet pipeline 411; and a purge medium inlet is provided at the upper part of the filter 41, and is in communication with the purge medium inlet pipeline 413. A purge medium inlet is provided at the top of the filter 43, and is in communication with the purge medium inlet pipeline 412; and a purge medium inlet is provided at the upper part of the filter 43, and is in communication with the purge medium inlet pipeline 414. A communication pipeline 415 is provided between the filtered oil outlet of the filter 41 and the oil slurry inlet of the filter 43. The outlet of the filter aid buffer tank 416 is in communication with the oil slurry inlets of the filter 41 and the filter 43 via the pipeline 418. The mixing medium inlet of the filter aid buffer tank 416 is in communication with the inlet line 417, and the mixing medium inlet of the filter aid buffer tank 416 is in communication with the filtered oil outlet pipelines of the filter 41 and the filter 43 via the pipeline 419.

When the filter system shown in FIG. 4 is used for filtering, the filter 41 and the filter 43 can be used in parallel, can be used in series, or can be switched in use. Upon being switched in use, when the filter 41 is in the state of online filtering, the filter 43 is subjected to the blowback and a filter cake layer of the filter aid is formed, or the filter 43 is in the backup state at the same time; or when the filter 43 is in the state of online filtering, the filter 41 is subjected to the blowback and a filter cake layer of the filter aid is formed, or the filter 41 is in the backup state at the same time.

Figure 5:
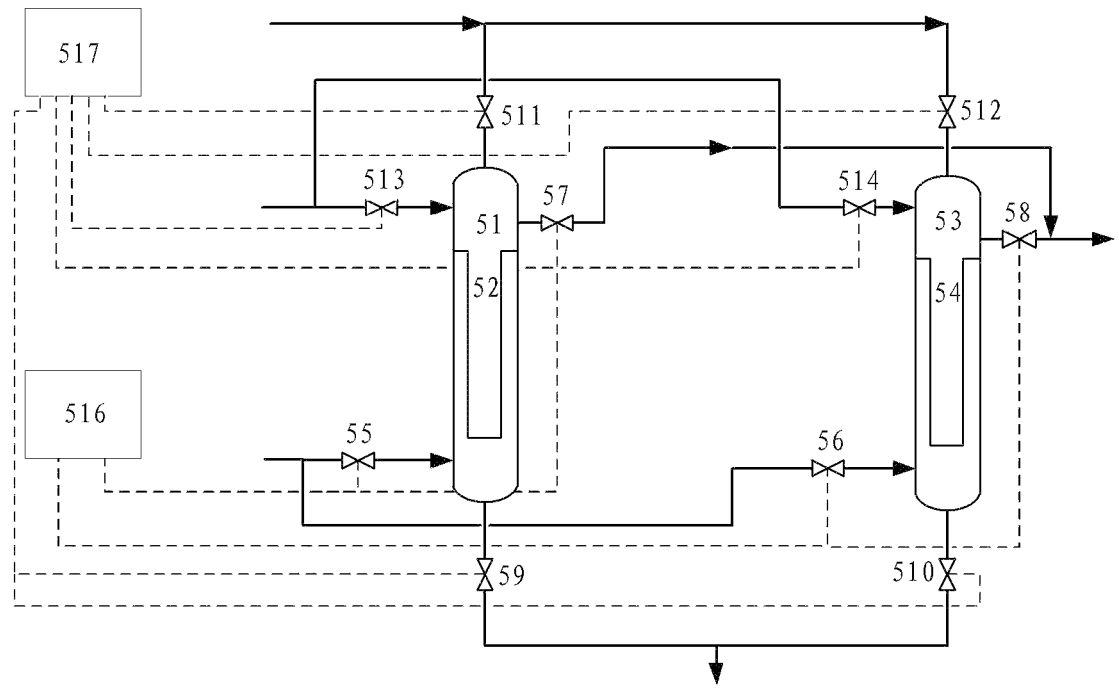
FIG. 5 is a schematic diagram of another embodiment of the multiple-filter system of the present invention.

FIG. 5 is a schematic diagram of an embodiment of the multiple-filter system of the present invention. As shown in FIG. 5, the multiple-filter system of the present invention includes a filter system and a control system, the filter system includes an oil slurry filter 51, an oil slurry filter 53, an oil slurry inlet pipeline 55, a filtered oil outlet pipeline 57 and a filter residue discharge pipeline 59 in communication with the filter 51; and an oil slurry inlet pipeline 56, a filtered oil outlet pipeline 58, and a filter residue discharge pipeline 510 in communication with the filter 53. A purge medium inlet is provided at the top of the filter 51, and is in communication with the purge medium inlet pipeline 511; and a purge medium inlet is provided at the upper part of the filter 51, and is in communication with the purge medium inlet pipeline 513. A purge medium inlet is provided at the top of the filter 53, and is in communication with the purge medium inlet pipeline 512; and a purge medium inlet is provided at the upper part of the filter 53, and is in communication with the purge medium inlet pipeline 514. Said control system includes an online pressure difference monitoring module, a filter control module 516 and a purge control module 517, said online pressure difference monitoring module is used to monitor the pressure difference of the filter used online, said filter control module 516 is used to control a single filter to switch on and switch off the filter system, and said purge control module 517 is used to control the purge process of the filter.

In the multiple-filter system of the present invention, the switching between the filtering and the blowback in the filters can be realized by opening or closing the control valves of the control system. In FIG. 5, each valve is named by adding V before the number of each pipeline. The operation of the filter is illustrated with reference to two filters connected in parallel in FIG. 5. The valve V55 and the valve V57 are opened by the filter control module 516 and other valves are closed, the filter 51 is firstly subjected to the operation of the filtering. When the online pressure difference monitoring module monitors that the pressure difference between the inlet and the outlet of the filter 51 reaches a set value, the valve V55 and the valve V57 are closed by the filter control module to switch the filter 51 off, and the valve V56 and the valve V58 are opened to switch the filter 53 on the filter system. Meanwhile, the valve V513 and the valve V59 are opened by the purge control module 517 to blowback the filter 51 with inert gas or with filtered oil. When the online pressure difference monitoring module monitors that the pressure difference between the inlet and the outlet of the filter 53 reaches a set value, the valve V56 and the valve V58 are closed to switch the filter 53 off, and the valve V55 and the valve V57 are opened, and the purged filter 51 is put into use for the operation of filtering. The valve V514 and the valve V510 are opened by the purge control module 517 to blowback the filter 53 with inert gas or with filtered oil. The above procedures are repeated.

Figure 6:
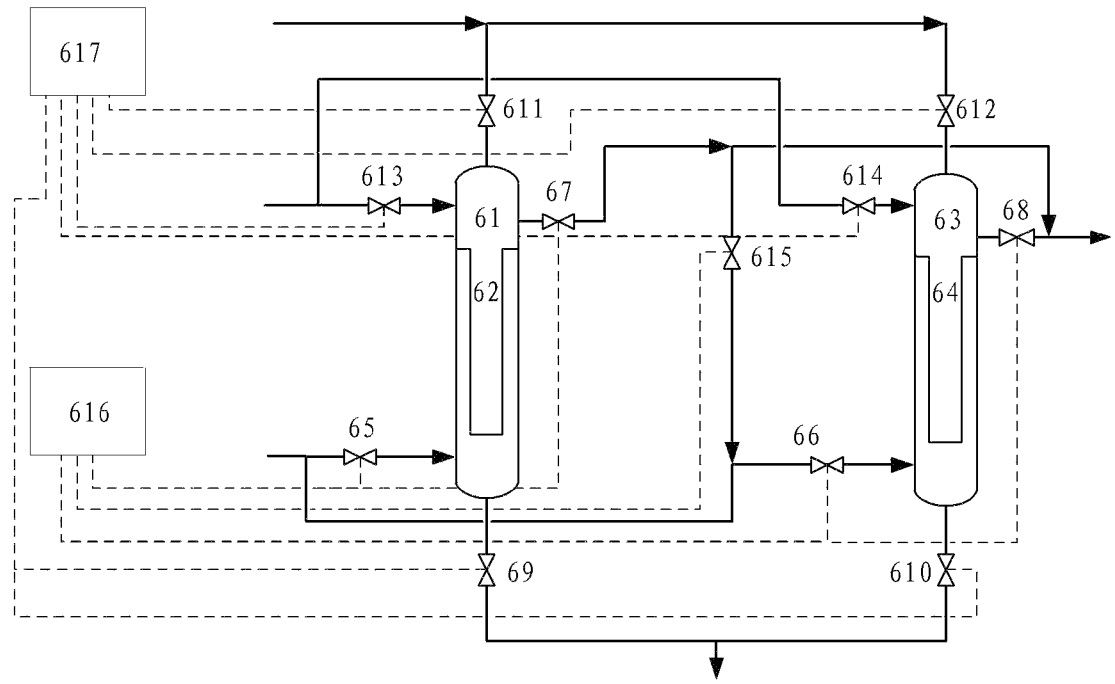
FIG. 6 is a schematic diagram of another embodiment of the multiple-filter system of the present invention.

FIG. 6 is a schematic diagram of an embodiment of the multiple-filter system of the present invention. As shown in FIG. 6, on the basis of FIG. 5, a communication pipeline 615 is added between the filtered oil outlet of the oil slurry filter 61 and the oil slurry inlet of the oil slurry filter 63.

When the filter system shown in FIG. 6 is used for filtering, the filter 61 and the filter 63 can be used in parallel, can be used in series, or can be switched in use. Upon being switched in use, when the filter 61 is in the state of online filtering, the filter 63 is subjected to the blowback or is in the backup state at the same time; or when the filter 63 is in the state of online filtering, the filter 61 is subjected to the blowback or is in the backup state at the same time. As shown in FIG. 6, when the valves V65, V67, V615, V66, and V68 are opened and other valves are closed, the operation of filterings in series with the filter 61 followed by the filter 63 can be performed.

Figure 7:
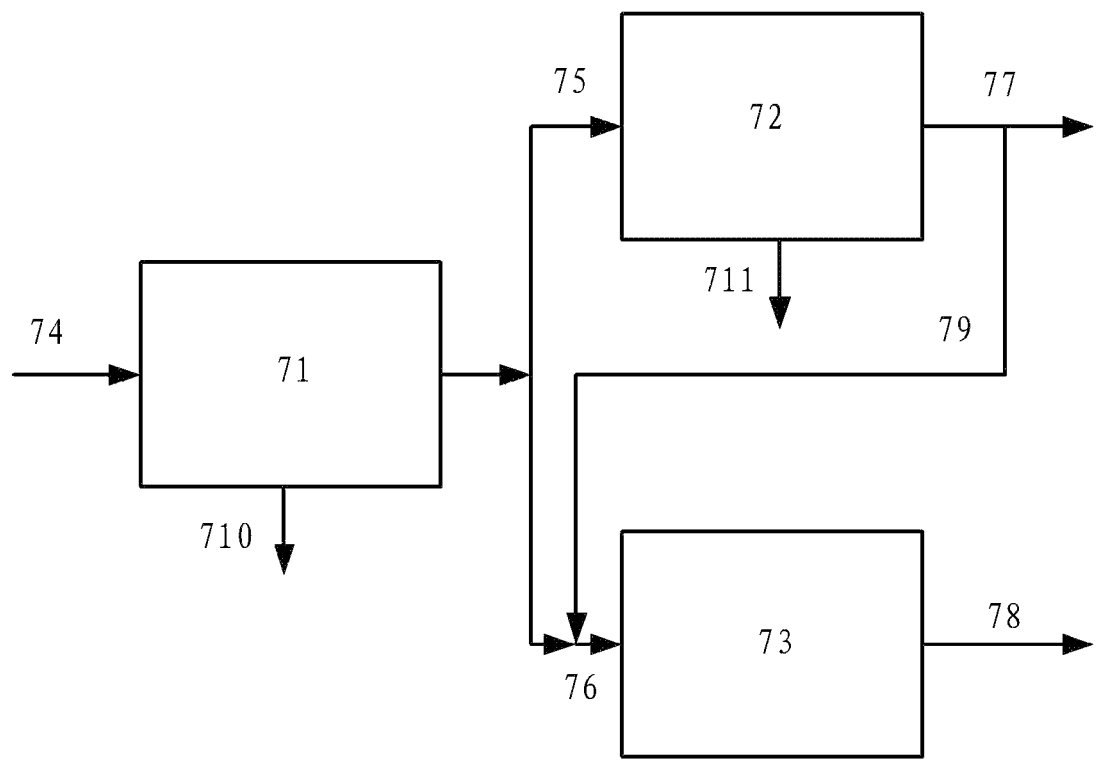
FIG. 7 is a schematic diagram of the structure of the multiple-stage filter system of the present invention.

FIG. 7 is a schematic diagram of the structure of the multiple-stage filter system of the present invention. As shown in FIG. 7, the multiple-stage filter system of the present invention includes a primary filter unit 71, a secondary filter unit 72 and a tertiary filter unit 73. Said primary filter unit 71 is provided with at least one oil slurry filter, and the oil slurry filter includes a filter component of flexible texture. Said secondary filter unit 72 is provided with an automatic backwashing filter device having a driving means. Said tertiary filter unit 73 is provided with at least one filter, and the filter includes a filter component of flexible texture. The primary filter unit 71 further includes an oil slurry inlet pipeline 74 and a filter residue outlet pipeline 710, the filtered oil outlet pipeline 75 of the primary filter unit 71 is in communication with the inlet of the secondary filter unit 72, the filtered oil outlet pipeline 76 of the primary filter unit 71 is in communication with the inlet of the tertiary filter unit 73. The secondary filter unit 72 includes a filter residue outlet pipeline 711 and a filtered oil outlet pipeline 77, the filtered oil outlet of the secondary filter unit 72 is in communication with the inlet of the tertiary filter unit 73 via the pipeline 79. The tertiary filter unit further includes a filtered oil outlet pipeline 78.

Figure 8:
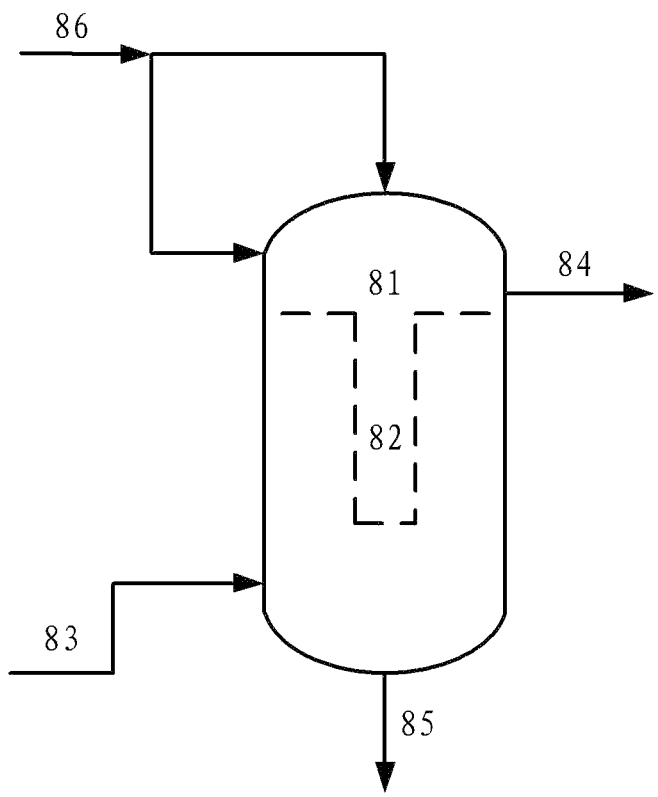
FIG. 8 is a schematic diagram of an embodiment of the primary filter unit of the multiple-stage filter system of the present invention.

FIG. 8 is a schematic diagram of an embodiment of the primary filter unit of the multiple-stage filter system of the present invention. As shown in FIG. 8, the primary filter unit includes an oil slurry filter 81, and an oil slurry inlet pipeline 83, a filtered oil outlet pipeline 84 and a filter residue discharge pipeline in communication with the first filter 81. The filter 81 is provided with a filter component of flexible texture 82 (flexible filter bag). An oil slurry inlet is provided at the lower part of the filter 81, a filtered oil outlet is provided at the upper part of the filter 81, and a filter residue outlet is provided at the bottom of the filter 81. Purge medium inlets are provided at the top and the upper part of the filter 81, and are in communication with the purge medium inlet pipeline 86.

Figure 9:
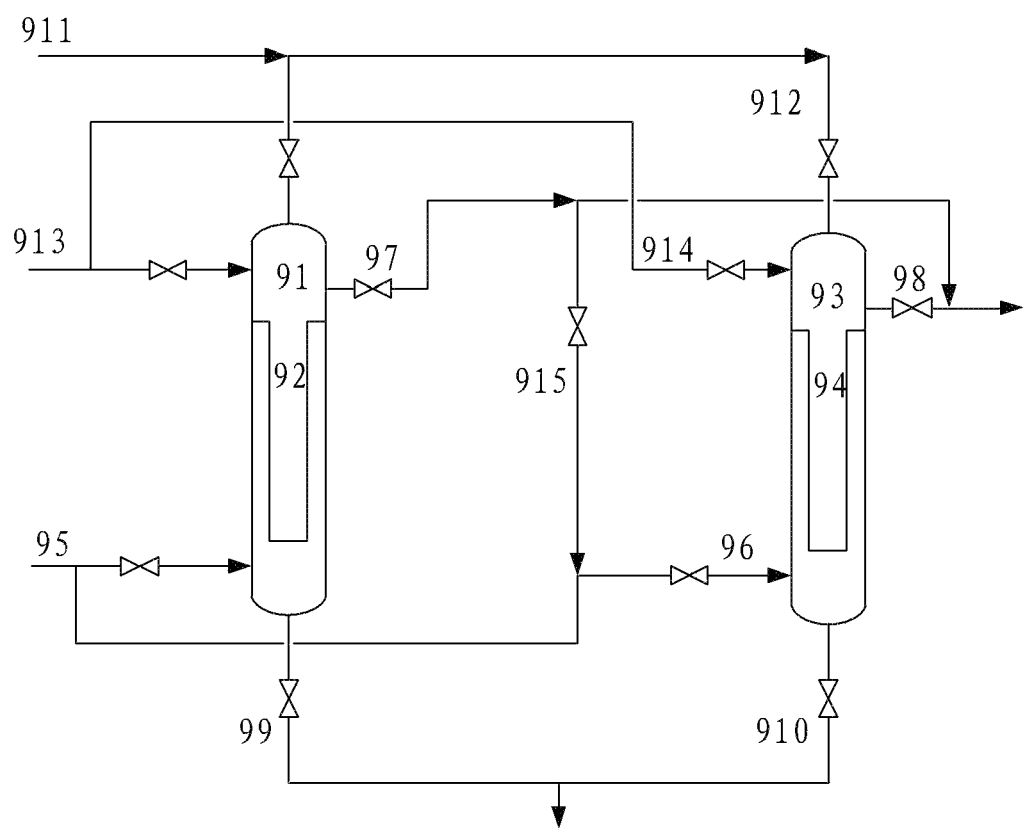
FIG. 9 is a schematic diagram of another embodiment of the primary filter unit of the multiple-stage filter system of the present invention.

FIG. 9 is a schematic diagram of an embodiment of the primary filter unit of the multiple-stage filter system of the present invention. As shown in FIG. 9, the primary filter unit includes an oil slurry filter 91; an oil slurry filter 93; an oil slurry inlet pipeline 95, a filtered oil outlet pipeline 97 and a filter residue discharge pipeline 99 in communication with the filter 91; and an oil slurry inlet pipeline 96, a filtered oil outlet pipeline 98 and a filter residue discharge pipeline 910 in communication with the filter 93. The filter 91 is provided with a filter component of flexible texture 92 (flexible filter bag). The first filter 93 is provided with a filter component of flexible texture 94 (flexible filter bag). A purge medium inlet is provided at the top of the filter 91, and is in communication with the purge medium inlet pipeline 911; and a purge medium inlet is provided at the upper part of the filter 91, and is in communication with the purge medium inlet pipeline 913. A purge medium inlet is provided at the top of the filter 93, and is in communication with the purge medium inlet pipeline 912; and a purge medium inlet is provided at the upper part of the filter 93, and is in communication with the purge medium inlet pipeline 914. A communication pipeline 915 is provided between the filtered oil outlet of the filter 41 and the oil slurry inlet of the filter 93.

When the primary filter unit shown in FIG. 9 is used for filtering, the filter 91 and the filter 93 can be used in parallel, can be used in series, or can be switched in use. Upon being switched in use, when the filter 91 is in the state of online filtering, the filter 93 is subjected to the blowback or is in the backup state at the same time; or when the filter 93 is in the state of online filtering, the filter 91 is subjected to the blowback or is in the backup state at the same time.

EXAMPLES

The present invention will be further explained below in conjunction with examples, but the present invention is not limited to these examples.

The physical properties of coal tar used in the examples are as follows.

|  | Coal tar A | Coal tar B |
| --- | --- | --- |
| Density (g/cm$^3$) | 1.15 | 1.20 |
| Viscosity at 100° C. (mm$^2$/s) | 2.8 | 3.2 |
| Solid particle content (μg/g) | 5522 | 8765 |

|  | Coal tar C | Coal tar D |
| --- | --- | --- |
| Density (g/cm$^3$) | 1.13 | 1.17 |
| Viscosity at 100° C. (mm$^2$/s) | 2.6 | 3.1 |
| Solid particle content (μg/g) | 5357 | 9018 |

|  | Coal tar E | Coal tar F |
| --- | --- | --- |
| Density (g/cm$^3$) | 1.21 | 1.29 |
| Viscosity at 100° C. (mm$^2$/s) | 3.0 | 3.6 |
| Solid particle content (μg/g) | 5900 | 9200 |

The physical properties of the oil slurry used in the examples are shown below.

Wherein, oil slurries A, C, D, F, G, and I are a catalytic cracking oil to slurry, oil slurry B is a mixture of a catalytic cracking oil slurry and a small amount of a catalytic cracking light cycle oil (LCO), oil slurry E is a mixture of a catalytic cracking oil slurry, a small amount of a catalytic cracking light cycle oil (LCO), and a small amount of catalytic cracking heavy cycle oil slurry H is a mixture of a catalytic cracking oil slurry and a small amount of a catalytic cracking heavy cycle oil (HCO).

|  | Oil slurry A | Oil slurry B | Oil slurry C |
| --- | --- | --- | --- |
| Density (g/cm$^3$) | 1.135 | 1.093 | 1.141 |
| Viscosity at 100° C. (mm$^2$/s) | 41 | 32 | 67 |
| Solid particle content (μg/g) | 1782 | 3735 | 10330 |

|  | Oil slurry D | Oil slurry E | Oil slurry F |
| --- | --- | --- | --- |
| Density (g/cm$^3$) | 1.139 | 1.086 | 1.148 |
| Viscosity at 100° C. (mm$^2$/s) | 42 | 31 | 65 |
| Solid particle content (μg/g) | 1902 | 3866 | 9893 |

|  | Oil slurry G | Oil slurry H | Oil slurry I |
| --- | --- | --- | --- |
| Density (g/cm$^3$) | 1.126 | 1.115 | 1.158 |
| Viscosity at 100° C. (mm$^2$/s) | 39 | 28 | 75 |
| Solid particle content (μg/g) | 2352 | 3520 | 11200 |

Examples I-1 to I-3

An oil slurry filter unit shown in FIG. 1 was used, wherein a single filter was provided, and a flexible filter bag was provided in the filter. The flexible filter bag included a solid-removal layer and a base cloth layer, and their specific property parameters were shown in Table I-1.

TABLE I-1

|  | Example I-1 | | Example I-2 | | Example I-3 | |
| --- | --- | --- | --- | --- | --- | --- |
|  | Solid-removal layer | Base cloth layer | Solid-removal layer | Base cloth layer | Solid-removal layer | Base cloth layer |
| Material | Polytetra-fluoroethylene | Polyphenylene sulfide filament | Polytetra-fluoroethylene | Polytetra-fluoroethylene | Polytetra-fluoroethylene | Polytetra-fluoroethylene and polyphenylene sulfide |
| Porosity | 95% | 30% | 95% | 40% | 95% | 38% |
| Basis weight | 550 ± 5% g/m$^2$ | | 550 ± 5% g/m$^2$ | | 550 ± 5% g/m$^2$ | |
| Warp-direction breaking strength | 900N/5 cm | | 2200N/5 cm | | 2100N/5 cm | |
| Weft-direction breaking strength | 1200N/5 cm | | 2400N/5 cm | | 2300N/5 cm | |
| Thickness | 2 ± 10% mm | | 2.8 ± 10% mm | | 2.5 ± 10% mm | |
| Filtering precision | 4 μm | | 4 μm | | 5 μm | |

Examples I-4 to I-5

An oil slurry filter unit shown in FIG. 2 was used, wherein two identical filters were provided, and flexible filter bags were provided in both of the two filters. The flexible filter bag included a solid-removal layer, a base cloth layer, and a lining layer, and their specific property parameters were shown in Table I-2.

TABLE I-2

|  | Example I-4 | | | Example I-5 | | |
| --- | --- | --- | --- | --- | --- | --- |
|  | Solid-removal layer | Base cloth layer | Lining layer | Solid-removal layer | Base cloth layer | Lining layer |
| Material | Polytetra-fluoroethylene | Polytetra-fluoroethylene | Polytetra-fluoroethylene and polyimide | Polytetra-fluoroethylene | Polytetra-fluoroethylene | Polytetra-fluoroethylene and glass fiber |
| Porosity | 95% | 40% | 35% | 95% | 40% | 35% |
| Fineness D | / | / | 1~2 | / | / | 1.5~3 |
| Basis weight | 550 ± 5% g/m$^2$ | | | 650 ± 5% g/m$^2$ | | |

TABLE I-2-continued

|  | Example I-4 | | | Example I-5 | | |
| --- | --- | --- | --- | --- | --- | --- |
|  | Solid-removal layer | Base cloth layer | Lining layer | Solid-removal layer | Base cloth layer | Lining layer |
| Warp-direction breaking strength | | 2200N/5 cm | | | 2300N/5 cm | |
| Weft-direction breaking strength | | 2200N/5 cm | | | 2500N/5 cm | |
| Thickness | | 2.6 ± 10% mm | | | 1.9 ± 10% mm | |
| Filtering precision | | 3 μm | | | 3 μm | |

Examples I-6 to I-8

An oil slurry filter unit shown in FIG. 1 was used, wherein a single filter was provided, and a flexible filter bag was provided in the filter. The flexible filter bag included a solid-removal layer, a precision layer, a base cloth layer, and a lining layer, and their specific property parameters were shown in Table I-3, Table I-4, and Table I-5.

TABLE I-3

|  | Example I-6 | | | |
| --- | --- | --- | --- | --- |
|  | Solid-removal layer | Precision layer | Base cloth layer | Lining layer |
| Material | Polytetrafluoroethylene | Polytetrafluoroethylene | Polytetrafluoroethylene | Polytetrafluoroethylene and glass fiber |
| Porosity | 95% | 95% | 40% | 30% |
| Fineness D | / | 0.2-0.3 | / | 1-2 |
| Basis weight | | 600 ± 5% g/m² | | |
| Warp-direction breaking strength | | 2400 N/5 cm | | |
| Weft-direction breaking strength | | 2600 N/5 cm | | |
| Thickness | | 2.8 ± 10% mm | | |
| Filtering precision | | 2 μm | | |

TABLE I-4

|  | Example I-7 | | | |
| --- | --- | --- | --- | --- |
|  | Solid-removal layer | Precision layer | Base cloth layer | Lining layer |
| Material | Polytetrafluoroethylene | Polytetrafluoroethylene | Polytetrafluoroethylene | Polytetrafluoroethylene |
| Porosity | 95% | 95% | 40% | 36% |
| Fineness D | / | 0.2-0.3 | / | 1-3 |
| Basis weight | | 580 ± 5% g/m² | | |
| Warp-direction breaking strength | | 2350 N/5 cm | | |
| Weft-direction breaking strength | | 2600 N/5 cm | | |
| Thickness | | 2.6 ± 10% mm | | |
| Filtering precision | | 2 μm | | |

TABLE I-5

|  | Example I-8 | | | |
| --- | --- | --- | --- | --- |
|  | Solid-removal layer | Precision layer | Base cloth layer | Lining layer |
| Material | Polytetrafluoroethylene | Polytetrafluoroethylene | Polytetrafluoroethylene | Polytetrafluoroethylene and polyimide |
| Porosity | 95% | 95% | 40% | 37% |
| Fineness D | / | 0.2-0.3 | / | 1-3 |
| Basis weight | | 580 ± 5% g/m² | | |
| Warp-direction breaking strength | | 2350 N/5 cm | | |
| Weft-direction breaking strength | | 2600 N/5 cm | | |
| Thickness | | 2.6 ± 10% mm | | |
| Filtering precision | | 2 μm | | |

Examples I-9 to I-11

This group of examples was used to illustrate an oil slurry filtration process by using the oil slurry filter units of Examples I-1 to I-3.

In Example I-9, the oil slurry A was sent to the filter of Example I-1 through the oil slurry inlet line in communication with the filter and filtered, and then the filtered oil was extracted from the filtered oil outlet line. The filtration temperature of the filter was 100° C., the filtration was set to proceed until the pressure difference was 0.12 MPa, and then the blowback was performed. When the pressure difference of the filter was 0.04 MPa, the collection of the filtered oil was initiated, and when the pressure difference reached 0.12 MPa, the feeding was stopped, the collection of the filtered oil was stopped, and the blowback with nitrogen gas at 100° C. was performed. The collected filtered oil was analyzed, and the solid particle content was 262 μg/g.

In Example I-10, the oil slurry B was sent to the filter of Example I-2 through the oil slurry inlet line in communication with the filter and filtered, and then the filtered oil was extracted from the filtered oil outlet line. The filtration temperature of the filter was 180° C., the filtration was set to proceed until the pressure difference was 0.30 MPa, and then the blowback was performed. When the pressure difference of the filter was 0.04 MPa, the collection of the filtered oil was initiated, and when the pressure difference reached 0.30 MPa, the feeding was stopped, the collection of the filtered oil was stopped, and the blowback with nitrogen gas at 180° C. was performed. The collected filtered oil was analyzed, and the solid particle content was 481 μg/g.

In Example I-11, the oil slurry C was sent to the filter of Example I-3 through the oil slurry inlet line in communication with the filter and filtered, and then the filtered oil was extracted from the filtered oil outlet line. The filtration temperature of the filter was 250° C., the filtration was set to proceed until the pressure difference was 0.45 MPa, and then the blowback was performed. When the pressure difference of the filter was 0.05 MPa, the collection of the filtered oil was initiated, and when the pressure difference reached 0.45 MPa, the feeding was stopped, the collection of the filtered oil was stopped, and the blowback with nitrogen gas at 250° C. was performed. The collected filtered oil was analyzed, and the solid particle content was 1106 μg/g.

Examples I-12 to I-13

This group of examples was used to illustrate an oil slurry filtration process by using the oil slurry filter units of Examples I-4 to I-5, wherein 2 filters in the filter unit were switched for use.

In Example I-12, the coal tar A was sent to the filter of Example I-4 through the oil slurry inlet line in communication with the filter and filtered, and then the filtered oil was extracted from the filtered oil outlet line. The filtration temperature of the filter was 60° C., the filtration was set to proceed until the pressure difference was 0.30 MPa, and then the blowback was performed. When the pressure difference of the filter was 0.04 MPa, the collection of the filtered oil was initiated, and when the pressure difference reached 0.30 MPa, the feeding was stopped, the collection of the filtered oil was stopped, and the blowback with nitrogen gas at room temperature was performed. The collected filtered oil was analyzed, and the solid particle content was 487 μg/g.

In Example I-13, the coal tar B was sent to the filter of Example I-5 through the oil slurry inlet line in communication with the filter and filtered, and then the filtered oil was extracted from the filtered oil outlet line. The filtration temperature of the filter was 80° C., the filtration was set to proceed until the pressure difference was 0.35 MPa, and then the blowback was performed. When the pressure difference of the filter was 0.04 MPa, the collection of the filtered oil was initiated, and when the pressure difference reached 0.35 MPa, the feeding was stopped, the collection of the filtered oil was stopped, and the blowback with nitrogen gas at 80° C. was performed. The collected filtered oil was analyzed, and the solid particle content was 765 μg/gh.

Examples I-14 to I-16

This group of examples was used to illustrate an oil slurry filtration process by using the oil slurry filter units of Examples I-6 to I-8.

In Example I-14, the oil slurry A was sent to the filter of Example I-6 through the oil slurry inlet line in communication with the filter and filtered, and then the filtered oil was extracted from the filtered oil outlet line. The filtration temperature of the filter was 130° C., the filtration was set to proceed until the pressure difference was 0.25 MPa, and then the blowback was performed. When the pressure difference of the filter was 0.05 MPa, the collection of the filtered oil was initiated, and when the pressure difference reached 0.25 MPa, the feeding was stopped, the collection of the filtered oil was stopped, and the blowback with nitrogen gas at 130° C. was performed. The collected filtered oil was analyzed, and the solid particle content was 155 μg/g.

In Example I-15, the oil slurry B was sent to the filter of Example I-7 through the oil slurry inlet line in communication with the filter and filtered, and then the filtered oil was extracted from the filtered oil outlet line. The filtration temperature of the filter was 150° C., the filtration was set to proceed until the pressure difference was 0.18 MPa, and then the blowback was performed. When the pressure difference of the filter was 0.04 MPa, the collection of the filtered oil was initiated, and when the pressure difference reached 0.18 MPa, the feeding was stopped, the collection of the filtered oil was stopped, and the blowback with nitrogen gas at 150° C. was performed. The collected filtered oil was analyzed, and the solid particle content was 356 μg/g.

In Example I-16, the oil slurry C was sent to the filter of Example I-8 through the oil slurry inlet line in communication with the filter and filtered, and then the filtered oil was extracted from the filtered oil outlet line. The filtration temperature of the filter was 180° C., the filtration was set to proceed until the pressure difference was 0.40 MPa, and then the blowback was performed. When the pressure difference of the filter was 0.04 MPa, the collection of the filtered oil was initiated, and when the pressure difference reached 0.40 MPa, the feeding was stopped, the collection of the filtered oil was stopped, and the blowback with nitrogen gas at 150° C. was performed. The collected filtered oil was analyzed, and the solid particle content was 983 μg/g.

Examples I-17 to I-18

An oil slurry filter unit shown in FIG. 1 was used, wherein a single filter was provided, and a flexible filter bag was provided in the filter. The flexible filter bag included a solid-removal layer, a precision layer, a base cloth layer, and a lining layer, and their specific property parameters were shown in Table I-6, and Table I-7.

TABLE I-6

| | Example I-17 | | | |
|---|---|---|---|---|
| | Solid-removal layer | Precision layer | Base cloth layer | Lining layer |
| Material | Polytetrafluoroethylene | Polytetrafluoroethylene | Polytetrafluoroethylene | Polytetrafluoroethylene and polyimide |
| Porosity | 30% | 65% | 40% | 37% |
| Fineness D | / | 0.2-0.3 | / | 1-3 |
| Basis weight | | 780 ± 5% g/m² | | |
| Warp-direction breaking strength | | 2150 N/ 5cm | | |
| Weft-direction breaking strength | | 2300 N/5 cm | | |
| Thickness | | 3.4 ± 10% mm | | |
| Filtering precision | | 0.2 μm | | |

TABLE I-7

| | Example I-18 | | |
|---|---|---|---|
| | Solid-removal layer | Base cloth layer | Lining layer |
| Material | Polytetrafluoroethylene | Polytetrafluoroethylene | Polytetrafluoroethylene |
| Porosity | 65% | 40% | 37% |
| Fineness D | / | / | 1-3 |
| Basis weight | | 560 ± 5% g/m² | |
| Warp-direction breaking strength | | 2250 N/5 cm | |
| Weft-direction breaking strength | | 2420 N/5 cm | |
| Thickness | | 2.7 ± 10% mm | |
| Filtering precision | | 1 μm | |

Examples I-19 to I-20

This group of examples was used to illustrate an oil slurry filtration process by using the oil slurry filter units of Examples I-17 to I-18.

In Example I-19, the oil slurry A was sent to the filter of Example I-17 through the oil slurry inlet line in communication with the filter and filtered, and then the filtered oil was extracted from the filtered oil outlet line. The filtration temperature of the filter was 120° C., the filtration was set to proceed until the pressure difference was 0.10 MPa, and then the blowback was performed. When the pressure difference of the filter was 0.01 MPa, the collection of the filtered oil was initiated, and when the pressure difference reached 0.10 MPa, the feeding was stopped, the collection of the filtered oil was stopped, and the blowback with nitrogen gas at 120° C. was performed. The collected filtered oil was analyzed, and the solid particle content was 148 μg/g.

In Example I-20, the oil slurry B was sent to the filter of Example I-18 through the oil slurry inlet line in communication with the filter and filtered, and then the filtered oil was extracted from the filtered oil outlet line. The filtration temperature of the filter was 125° C., the filtration was set to proceed until the pressure difference was 0.13 MPa, and then the blowback was performed. When the pressure difference of the filter was 0.02 MPa, the collection of the filtered oil was initiated, and when the pressure difference reached 0.20 MPa, the feeding was stopped, the collection of the filtered oil was stopped, and the blowback with nitrogen gas at 125° C. was performed. The collected filtered oil was analyzed, and the solid particle content was 335 μg/g.

Examples I-19 and I-20 demonstrated that the use of the filter component with a smaller precision could initiate the collection of the filtrate product when the pressure difference was relatively low, and therefore the efficiency of the filter could be improved. Moreover, the filtration effect was excellent.

Comparative Examples I-1 to I-2

In this group of comparative examples, oil slurry filter units of Examples I-1 to I-2 were used.

In Comparative Example I-1, the filtering and the collection of the filtered oil were performed in the same manner as Example I-9 except that the filtered oil was collected when the pressure difference of the filter was from 0.005 MPa to 0.01 MPa. The filtered oil that was collected when the pressure difference of filter was from 0.005 MPa to 0.01 MPa was analyzed, and the solid particle content was 908 μg/g.

In Comparative Example I-2, the filtering and the collection of the filtered oil were performed in the same manner as Example I-10 except that the filtered oil was collected during the period from the beginning of the filtration to the point at which the pressure difference of the filter was 0.01 MPa. The filtered oil that was collected during the period from the beginning of the filtration to the point at which the pressure difference of the filter was 0.01 MPa was analyzed, and the solid particle content was 2463 μg/g.

Comparative Example I-1 and Comparative Example I-2 demonstrated that when the pressure difference of the filter of lower than 0.01 MPa was used, the filtration effect was poor.

Examples II-1 to II-3

An oil slurry filter unit shown in FIG. 3 was used, wherein a single oil slurry filter was provided, and a flexible filter bag was provided in the filter. The specific property parameters of the flexible filter bag were shown in Table II-1.

A filter aid and a mixing medium were loaded in a filter aid buffer tank, the mixing medium is a filtered oil, the filter aid for Example II-1 and Example II-2 was diatomite, and the filter aid for Example II-3 was a filter residue obtained from the filtration.

TABLE II-1

|  | Example II-1 | Example II-2 | Example II-3 |
|---|---|---|---|
| Material | Polyester fiber | Polytetrafluoroethylene | Polypropylene fiber |
| Porosity | 85% | 87% | 90% |
| Basis weight | 940 ± 5% g/m$^2$ | 550 ± 5% g/m$^2$ | 900 ± 5% g/m$^2$ |
| Warp-direction breaking strength | 3480 N/5 cm | 2200 N/5 cm | 8006 N/5 cm |
| Weft-direction breaking strength | 5760 N/5 cm | 2200 N/5 cm | 10398 N/5 cm |
| Thickness | 1.5 ± 10% mm | 1.0 ± 10% mm | 0.9 ± 10% mm |
| Filtering precision | 5 μm | 8 μm | 10 μm |

Examples II-4 to II-5

An oil slurry filter unit shown in FIG. 4 was used, wherein two identical oil slurry filters were provided, and flexible filter bags were provided in both of the two filters. The specific property parameters of the flexible filter bag were shown in Table II-2.

TABLE II-2

|  | Example II-4 | Example II-5 |
|---|---|---|
| Material | Vinylon | Polypropylene fiber + Polyester fiber |
| Porosity | 95% | 98% |
| Basis weight | 560 ± 5% g/m$^2$ | 950 ± 5% g/m$^2$ |
| Warp-direction breaking strength | 2200 N/5 cm | 7500 N/5 cm |
| Weft-direction breaking strength | 4500 N/5 cm | 10650 N/5 cm |
| Thickness | 1.6 ± 10% mm | 1.3 ± 10% mm |
| Filtering precision | 20 μm | 15 μm |

Examples II-6 to II-8

This group of examples was used to illustrate an oil slurry filtration process by using the oil slurry filter units of Examples II-1 to II-3.

In Example II-6, the oil slurry filter unit of Example II-1 was used. The filter aid diatomite and the mixing medium were added to the filter through the oil slurry inlet line in communication with the filter, and when a filter cake layer was formed on the surface of the flexible filter bag, the addition of the filter aid to the filter was stopped. The oil slurry A was sent to the aforementioned filter, in which the filter cake layer of the filter aid was formed, through the oil slurry inlet line in communication with the filter and filtered, and then the filtered oil was extracted from the filtered oil outlet line.

When the filter aid was formed into the filter cake layer, the temperature of the filter was 150° C., and when the pressure difference of the filter was 0.05 MPa, the addition of the filter aid was stopped. The formed filter cake layer had a thickness of 4±0.5 mm.

When the oil slurry was filtered, the filtration temperature of the filter was 150° C., the filtration was set to proceed until the pressure difference was 0.40 MPa, and then the blowback was performed. When the pressure difference of the filter was 0.06 MPa, the collection of the filtered oil was initiated, and when the pressure difference reached 0.40 MPa, the feeding was stopped, the collection of the filtered oil was stopped, and the blowback with nitrogen gas at 150° C. was performed. The collected filtered oil was analyzed, and the solid particle content was 86 μg/g.

In Example II-7, the oil slurry filter unit of Example II-2 was used. The filter aid diatomite and the mixing medium were added to the filter through the oil slurry inlet line in communication with the filter, and when a filter cake layer was formed on the surface of the flexible filter bag, the addition of the filter aid was stopped. The oil slurry B was sent to the aforementioned filter, in which the filter cake layer of the filter aid was formed, through the oil slurry inlet line in communication with the filter and filtered, and then the filtered oil was extracted from the filtered oil outlet line.

When the filter aid was formed into the filter cake layer, the temperature of the filter was 120° C., and when the pressure difference of the filter was 0.05 MPa, the addition of the filter aid was stopped. The formed filter cake layer had a thickness of 2±0.5 mm.

When the oil slurry was filtered, the filtration temperature of the filter was 120° C., the filtration was set to proceed until the pressure difference was 0.35 MPa, and then the blowback was performed. When the pressure difference of the filter was 0.06 MPa, the collection of the filtered oil was initiated, and when the pressure difference reached 0.35 MPa, the feeding was stopped, the collection of the filtered oil was stopped, and the blowback with nitrogen gas at 120° C. was performed. The collected filtered oil was analyzed, and the solid particle content was 135 μg/g.

In Example II-8, the oil slurry filter unit of Example II-3 was used. The filter aid was a filter residue obtained from the filter, and the filter aid and the mixing medium were added to the filter through the oil slurry inlet line in communication with the filter, and when a filter cake layer was formed on the surface of the flexible filter bag, the addition of the filter aid was stopped. The oil slurry C was sent to the aforementioned filter, in which the filter cake layer was formed, through the oil slurry inlet line in communication with the filter and filtered, and then the filtered oil was extracted from the filtered oil outlet line.

When the filter aid was formed into the filter cake layer, the temperature of the filter was 220° C., and when the pressure difference of the filter was 0.05 MPa, the addition of the filter aid was stopped. The formed filter cake layer had a thickness of 7±0.5 mm.

When the oil slurry was filtered, the filtration temperature of the filter was 220° C., the filtration was set to proceed until the pressure difference was 0.45 MPa, and then the blowback was performed. When the pressure difference of the filter was 0.06 MPa, the collection of the filtered oil was initiated, and when the pressure difference reached 0.45 MPa, the feeding was stopped, the collection of the filtered oil was stopped, and the blowback with nitrogen gas at 180° C. was performed. The collected filtered oil was analyzed, and the solid particle content was 275 μg/g.

Examples II-9 to II-10

This group of examples was used to illustrate an oil slurry filtration process by using the oil slurry filter units of Examples II-4 to II-5, wherein 2 filters in the filter unit were switched for use.

In Example II-9, the oil slurry filter unit of Example II-4 was used. The filter aid cellulose and the mixing medium were added to the filter through the oil slurry inlet line in communication with the filter, and when a filter cake layer was formed on the surface of the flexible filter bag, the addition of the filter aid was stopped. The coal tar A was sent to the aforementioned filter, in which the filter cake layer was formed, through the oil slurry inlet line in communication with the filter and filtered, and then the filtered oil was extracted from the filtered oil outlet line.

When the filter aid was formed into the filter cake layer, the temperature of the filter was 60° C., and when the pressure difference of the filter was 0.05 MPa, the addition of the filter aid was stopped. The formed filter cake layer had a thickness of 2±0.5 mm.

When the oil slurry was filtered, the filtration temperature of the filter was 60° C., the filtration was set to proceed until the pressure difference was 0.40 MPa, and then the blowback was performed. When the pressure difference of the filter was 0.06 MPa, the collection of the filtered oil was initiated, and when the pressure difference reached 0.40 MPa, the feeding was stopped, the collection of the filtered oil was stopped, and the blowback with nitrogen gas at normal temperature was performed. The collected filtered oil was analyzed, and the solid particle content was 185 μg/g.

In Example II-10, the oil slurry filter unit of Example II-5 was used. The filter aid was a filter residue obtained from the filter, and the filter aid and the mixing medium were added to the filter through the oil slurry inlet line in communication with the filter, and when a filter cake layer was formed on the surface of the flexible filter bag, the addition of the filter aid was stopped. The coal tar B was sent to the aforementioned filter, in which the filter cake layer was formed, through the oil slurry inlet line in communication with the filter and filtered, and then the filtered oil was extracted from the filtered oil outlet line.

When the filter aid was formed into the filter cake layer, the temperature of the filter was 90° C., and when the pressure difference of the filter was 0.05 MPa, the addition of the filter aid was stopped. The formed filter cake layer had a thickness of 5±0.5 mm.

When the oil slurry was filtered, the filtration temperature of the filter was 90° C., the filtration was set to proceed until the pressure difference was 0.45 MPa, and then the blowback was performed. When the pressure difference of the filter was 0.06 MPa, the collection of the filtered oil was initiated, and when the pressure difference reached 0.45 MPa, the feeding was stopped, the collection of the filtered oil was stopped, and the blowback with nitrogen gas at 90° C. was performed. The collected filtered oil was analyzed, and the solid particle content was 252 μg/g.

Examples III-1 to III-3

A multiple-filter system shown in FIG. 5 was used, wherein two identical filters were provided, and flexible filter bags were provided in both of the two filters. The flexible filter bag included a solid-removal layer and a base cloth layer, and their specific property parameters were shown in Table III-1.

TABLE III-1

| | Example III-1 | | Example III-2 | | Example III-3 | |
| --- | --- | --- | --- | --- | --- | --- |
| | Solid-removal layer | Base cloth layer | Solid-removal layer | Base cloth layer | Solid-removal layer | Base cloth layer |
| Material | Polytetra-fluoroethylene | Polyphenylene sulfide filament | Polytetra-fluoroethylene | Polytetra-fluoroethylene | Polytetra-fluoroethylene | Polytetra-fluoroethylene and polyphenylene sulfide |
| Porosity | 95% | 30% | 95% | 40% | 95% | 38% |
| Basis weight | 550 ± 5% g/m² | | 550 ± 5% g/m² | | 550 ± 5% g/m² | |
| Warp-direction breaking strength | | 900N/5 cm | | 2200N/5 cm | | 2100N/5 cm |
| Weft-direction breaking strength | | 1200N/5 cm | | 2400N/5 cm | | 2300N/5 cm |
| Thickness | 2 ± 10% mm | | 2.8 ± 10% mm | | 2.5 ± 10% mm | |
| Filtering precision | 4 μm | | 4 μm | | 5 μm | |

Examples III-4 to III-5

A multiple-filter system shown in FIG. 6 was used, wherein two identical filters were provided, and flexible filter bags were provided in both of the two filters. The flexible filter bag included a solid-removal layer, a base cloth layer, and a lining layer, and their specific property parameters were shown in Table III-2.

TABLE III-2

| | Example III-4 | | | Example III-5 | | |
|---|---|---|---|---|---|---|
| | Solid-removal layer | Base cloth layer | Lining layer | Solid-removal layer | Base cloth layer | Lining layer |
| Material | Polytetrafluoroethylene | Polytetrafluoroethylene | Polytetrafluoroethylene and polyimide | Polytetrafluoroethylene | Polytetrafluoroethylene | Polytetrafluoroethylene and glass fiber |
| Porosity | 95% | 40% | 35% | 95% | 40% | 35% |
| Fineness D | / | / | 1~2 | / | / | 1.5~3 |
| Basis weight | | 550 ± 5% g/m² | | | 650 ± 5% g/m² | |
| Warp-direction breaking strength | | 2200N/5 cm | | | 2300N/5 cm | |
| Weft-direction breaking strength | | 2200N/5 cm | | | 2500N/5 cm | |
| Thickness | | 2.6 ± 10% mm | | | 1.9 ± 10% mm | |
| Filtering precision | | 3 μm | | | 3 μm | |

Examples III-6 to III-8

A multiple-filter system shown in FIG. 6 was used, wherein two identical filters were provided, and flexible filter bags were provided in the filters. The flexible filter bag included a solid-removal layer, a precision layer, a base cloth layer, and a lining layer, and their specific property parameters were shown in Table III-3, Table III-4, and Table III-5.

TABLE III-3

| | Example III-6 | | | |
|---|---|---|---|---|
| | Solid-removal layer | Precision layer | Base cloth layer | Lining layer |
| Material | Polytetrafluoroethylene | Polytetrafluoroethylene | Polytetrafluoroethylene | Polytetrafluoroethylene and glass fiber |
| Porosity | 95% | 95% | 40% | 30% |
| Fineness D | / | 0.2-0.3 | / | 1-2 |
| Basis weight | | 600 ± 5% g/m² | | |
| Warp-direction breaking strength | | 2400 N/5 cm | | |
| Weft-direction breaking strength | | 2600 N/5 cm | | |
| Thickness | | 2.8 ± 10% mm | | |
| Filtering precision | | 2 μm | | |

TABLE III-4

| | Example III-7 | | | |
|---|---|---|---|---|
| | Solid-removal layer | Precision layer | Base cloth layer | Lining layer |
| Material | Polytetrafluoroethylene | Polytetrafluoroethylene | Polytetrafluoroethylene | Polytetrafluoroethylene |
| Porosity | 95% | 95% | 40% | 36% |
| Fineness D | / | 0.2-0.3 | / | 1-3 |
| Basis weight | | 580 ± 5% g/m² | | |
| Warp-direction breaking strength | | 2350 N/5 cm | | |
| Weft-direction breaking strength | | 2600 N/5 cm | | |
| Thickness | | 2.6 ± 10% mm | | |
| Filtering precision | | 2 μm | | |

TABLE III-5

| | Example III-8 | | | |
|---|---|---|---|---|
| | Solid-removal layer | Precision layer | Base cloth layer | Lining layer |
| Material | Polytetrafluoroethylene | Polytetrafluoroethylene | Polytetrafluoroethylene | Polytetrafluoroethylene and polyimide |
| Porosity | 95% | 95% | 40% | 37% |
| Fineness D | / | 0.2-0.3 | / | 1-3 |
| Basis weight | | 580 ± 5% g/m² | | |
| Warp-direction breaking strength | | 2350 N/5 cm | | |
| Weft-direction breaking strength | | 2600 N/5 cm | | |
| Thickness | | 2.6 ± 10% mm | | |
| Filtering precision | | 2 μm | | |

Examples III-9 to III-11

This group of examples was used to illustrate an oil slurry filtration process by using the multiple-filter systems of Examples III-1 to III-3.

In Example III-9, the oil slurry D was sent to the filter system of Example III-1 through the oil slurry inlet line in communication with the filter and filtered, and then the filtered oil was extracted from the filtered oil outlet line. The filtration temperature of the filter was 100° C. The to pressure difference of the filter used online was detected with an online pressure difference monitoring module. The filtration was set in such a way that when the pressure difference was 0.12 MPa, the filters were switched and the switched-off filter was blown back, with nitrogen gas at 100° C. for blowback, and two filters took turns to be operated. When the pressure difference of the filter was 0.04 MPa, the collection of the filtered oil was initiated. The collected filtered oil was analyzed, and the solid particle content was 253 μg/g.

In Example III-10, the oil slurry E was sent to the filter of Example III-2 through the oil slurry inlet line in communication with the filter and filtered, and then the filtered oil was extracted from the filtered oil outlet line. The filtration temperature of the filter was 180° C. The pressure difference of the filter used online was detected with an online pressure difference monitoring module. The filtration was set in such a way that when the pressure difference was 0.30 MPa, the filters were switched and the switched-off filter was blown back, with nitrogen gas at 180° C. for blowback, and two filters took turns to be operated. When the pressure difference of the filter was 0.04 MPa, the collection of the filtered oil was initiated. The collected filtered oil was analyzed, and the solid particle content was 456 μg/g.

In Example III-11, the oil slurry F was sent to the filter of Example III-3 through the oil slurry inlet line in communication with the filter and filtered, and then the filtered oil was extracted from the filtered oil outlet line. The filtration temperature of the filter was 250° C. The pressure difference of the filter used online was detected with an online pressure difference monitoring module. The filtration was set in such a way that when the pressure difference was 0.45 MPa, the filters were switched and the switched-off filter was blown back, with nitrogen gas at 250° C. for blowback, and two filters took turns to be operated. When the pressure difference of the filter was 0.05 MPa, the collection of the filtered oil was initiated. The collected filtered oil was analyzed, and the solid particle content was 1038 μg/g.

Examples III-12 to III-13

This group of examples was used to illustrate an oil slurry filtration process by using the multiple-filter systems of Examples III-4 to III-5.

In Example III-12, the coal tar C was sent to the filter of Example III-4 through the oil slurry inlet line in communication with the filter and filtered, and then the filtered oil was extracted from the filtered oil outlet line. The filtration temperature of the filter was 60° C. The pressure difference of the filter used online was detected with an online pressure difference monitoring module. The filtration was set in such a way that when the pressure difference was 0.3 MPa, the backup filter was switched on the filter system, and when the pressure difference of the switched-on backup filter was 0.04 MPa, the online filter, the pressure difference of which had previously reached 0.3 MPa, was switched off the filter system and blown back, with nitrogen gas at normal temperature for blowback, and two filters took turns to be operated. When the pressure difference of the filter was 0.04 MPa, the collection of the filtered oil was initiated, The collected filtered oil was analyzed, and the solid particle content was 463 μg/g.

In Example III-13, the coal tar D was sent to the filter of Example III-5 through the oil slurry inlet line in communication with the filter and filtered, and then the filtered oil was extracted from the filtered oil outlet line. The filtration temperature of the filter was 80° C. The pressure difference of the filter used online was detected with an online pressure difference monitoring module. The filtration was set in such a way that when the pressure difference was 0.35 MPa, the filters were switched and the swithced-off filter was blown back, with nitrogen gas at 80° C. for blowback, and two filters took turns to be operated. When the pressure difference of the filter was 0.04 MPa, the collection of the filtered oil was initiated. The collected filtered oil was analyzed, and the solid particle content was 706 μg/g.

Examples III-14 to III-16

This group of examples was used to illustrate an oil slurry filtration process by using the multiple-filter systems of Examples III-6 to III-8.

In Example III-14, the oil slurry D was sent to the filter of Example III-6 through the oil slurry inlet line in communication with the filter and filtered, and then the filtered oil was extracted from the filtered oil outlet line. The filtration temperature of the filter was 130° C., and the valve V615 was closed all along. The pressure difference of the filter used online was detected with an online pressure difference monitoring module. The filtration was set in such a way that when the pressure difference was 0.35 MPa, the filters were switched and the switched-off filter was blown back, with nitrogen gas at 130° C. for blowback, and two filters took turns to be operated. When the pressure difference of the filter was 0.05 MPa, the collection of the filtered oil was initiated. The collected filtered oil was analyzed, and the solid particle content was 146 μg/g.

In Example III-15, the oil slurry E was sent to the filter of Example III-7 through the oil slurry inlet line in communication with the filter and filtered, and then the filtered oil was extracted from the filtered oil outlet line. The filtration temperature of the filter was 150° C., and the valve V615 was closed all along. The pressure difference of the filter used online was detected with an online pressure difference monitoring module. The filtration was set in such a way that when the pressure difference was 0.18 MPa, the filters were switched and the switched-off filter was blown back, with nitrogen gas at 150° C. for blowback, and two filters took turns to be operated. When the pressure difference of the filter was 0.04 MPa, the collection of the filtered oil was initiated. The collected filtered oil was analyzed, and the solid particle content was 331 μg/g.

In Example III-16, the oil slurry F was sent to the filter of Example III-8 through the oil slurry inlet line in communication with the filter and filtered, the valves V65, V67, V615, V66, and V68 were open and other valves were closed, two filters were changed into the state of connection in series with the filter 61 being before the filter 63. The filtered oil was extracted from the filtered oil outlet line. The filtration temperature of the filter was 180° C. The differential pressure of the filter used online was detected with an online differential pressure monitoring module. The filtration was set in such a way that when the total differential pressure was 0.45 MPa, the two filters were switched off and the two switched-off filters were blown back respectively, with nitrogen gas at 150° C. for blowback respectively. The total differential pressure of the filters was 0.06 MPa, the collection of the filtered oil was initiated, and when the total differential pressure reached 0.45 MPa, the feeding was stopped and the collection of the filtered oil was stopped. The collected filtered oil was analyzed, and the solid particle content was 875 μg/g.

Example IV-1

The multiple-stage oil slurry filter system included a primary filter unit, a secondary filter unit and a tertiary filter unit, the filtered oil outlet of the primary filter unit was in communication with the inlet of the secondary filter unit, and the filtered oil outlet of the secondary filter unit was in communication with the inlet of the tertiary filter unit.

A filter unit as shown in FIG. 8 was provided in the primary filter unit, which included a filter in which a flexible filter bag was provided. The flexible filter bag included a solid-removal layer and a base cloth layer, and their specific property parameters were shown in Table IV-1. An automatic backwashing filter device having a driving means was provided in the secondary filter unit, the filtering material had a filtering precision of 1.5 micrometers, and the filter area was one-twentieth of the filter area of the filter in the primary filter unit. A single filter was provided in the tertiary filter unit. A flexible filter bag was provided in the filter, and its specific property parameters were shown in Table IV-1.

The filter area of the filter in the tertiary filter unit was 4.5 times the filter area of the filter in the primary filter unit.

TABLE IV-1

|  | Flexible filter bag of the filter in the primary filter unit | | Flexible filter bag of the filter in the tertiary filter unit |
| --- | --- | --- | --- |
|  | Solid-removal layer | Base cloth layer | |
| Material | Polytetrafluoroethylene | Polyphenylene sulfide filament | Vinylon |
| Porosity | 90% | 30% | 55% |
| Basis weight | 550 ± 5% g/m² | | 560 ± 5% g/m² |
| Warp-direction breaking strength | 900 N/5 cm | | 2200 N/5 cm |
| Weft-direction breaking strength | 1200 N/5 cm | | 4500 N/5 cm |
| Thickness | 2 ± 10% mm | | 1.6 ± 10% mm |
| Filtering precision | 3 μm | | 0.3 μm |

Example IV-2

The multiple-stage oil slurry filter system included a primary filter unit and a tertiary filter unit, the filtered oil outlet of the primary filter unit was in communication with the inlet of the tertiary filter unit.

Two identical filters as shown in FIG. 9 were provided in the primary filter unit, and flexible filter bags were provided in the filters. The flexible filter bag included a solid-removal layer and a base cloth layer, and their specific property parameters were shown in Table IV-2. A single filter was provided in the tertiary filter unit. A flexible filter bag was provided in the filter, and its specific property parameters were shown in Table IV-2.

The filter area of the filter in the tertiary filter unit was 6 times the filter area of the filter in the primary filter unit.

TABLE IV-2

| | Flexible filter bag of the filter in the primary filter unit | | Flexible filter bag of the filter in the tertiary filter unit |
|---|---|---|---|
| | Solid-removal layer | Base cloth layer | |
| Material | Polytetrafluoroethylene | Polytetrafluoroethylene | Polyester fiber |
| Porosity | 95% | 40% | 50% |
| Basis weight | 550 ± 5% g/m² | | 940 ± 5% g/m² |
| Warp-direction breaking strength | 2200 N/5 cm | | 3480 N/5 cm |
| Weft-direction breaking strength | 2400 N/5 cm | | 5760 N/5 cm |
| Thickness | 2.8 ± 10% mm | | 1.5 ± 10% mm |
| Filtering precision | 4 μm | | 0.3 μm |

Example IV-3

The multiple-stage oil slurry filter system included a primary filter unit, a secondary filter unit and a tertiary filter unit, the filtered oil outlet of the primary filter unit was in communication with the inlet of the secondary filter unit, and the filtered oil outlet of the secondary filter unit was in communication with the inlet of the tertiary filter unit.

Two identical filters as shown in FIG. 9 were provided in the primary filter unit, and flexible filter bags were provided in the filters. The flexible filter bag included a solid-removal layer, a precision layer, a base cloth layer, and a lining layer, and their specific property parameters were shown in Table IV-3. An automatic backwashing filter device having a driving means was provided in the secondary filter unit, the filtering material had a filtering precision of 1 micrometer, and the filter area was one-fifteenth of the filter area of the filter in the primary filter unit. A single filter was provided in the tertiary filter unit. A flexible filter bag was provided in the filter, and its specific property parameters were shown in Table IV-3.

The filter area of the filter in the tertiary filter unit was 8 times the filter area of the filter in the primary filter unit.

TABLE IV-3

| | Flexible filter bag of the filter in the primary filter unit | | | | Flexible filter bag of the filter in the tertiary filter unit |
|---|---|---|---|---|---|
| | Solid-removal layer | Precision layer | Base cloth layer | Lining layer | |
| Material | Polytetrafluoroethylene | Polytetrafluoroethylene | Polytetrafluoroethylene | Polytetrafluoroethylene and glass fiber | Polypropylene fiber + Polyester fiber |
| Porosity | 95% | 95% | 40% | 30% | 60% |
| Fineness D | / | 0.2-0.3 | / | 1-2 | / |
| Basis weight | | | 600 ± 5% g/m² | | 950 ± 5% g/m² |
| Warp-direction breaking strength | | | 2400 N/5 cm | | 7500 N/5 cm |
| Weft-direction breaking strength | | | 2600 N/5 cm | | 10650 N/5 cm |
| Thickness | | | 2.8 ± 10% mm | | 1.3 ± 10% mm |
| Filtering precision | | | 2 μm | | 0.3 μm |

Example IV-4

The multiple-stage oil slurry filter system included a primary filter unit and a secondary filter unit, the filtered oil outlet of the primary filter unit was in communication with the inlet of the secondary filter unit.

Two identical filters as shown in FIG. 9 were provided in the primary filter unit, and flexible filter bags were provided in the filters. The flexible filter bag included a solid-removal layer, a base cloth layer, and a lining layer, and their specific property parameters were shown in Table IV-4. An automatic backwashing filter device having a driving means was provided in the secondary filter unit, the filtering material had a filtering precision of 2 micrometers, and the filter area was one-fifteenth of the filter area of the filter in the primary filter unit.

TABLE IV-4

| | Flexible filter bag of the filter in the primary filter unit | | |
|---|---|---|---|
| | Solid-removal layer | Base cloth layer | Lining layer |
| Material | Polytetrafluoroethylene | Polytetrafluoroethylene | Polytetrafluoroethylene and glass fiber |
| Porosity | 95% | 40% | 35% |
| Fineness D | / | / | 1.5-3 |
| Basis weight | | 650 ± 5% g/m² | |
| Warp-direction breaking strength | | 2300 N/5 cm | |
| Weft-direction breaking strength | | 2500 N/5 cm | |
| Thickness | | 1.9 ± 10% mm | |
| Filtering precision | | 3 μm | |

Example IV-5

The multiple-stage oil slurry filter system included a primary filter unit and a tertiary filter unit, the filtered oil outlet of the primary filter unit was in communication with the inlet of the tertiary filter unit.

A single filter as shown in FIG. 8 was provided in the primary filter unit, and a flexible filter bag was provided in the filter. The flexible filter bag included a solid-removal layer, a precision layer, a base cloth layer, and a lining layer, and their specific property parameters were shown in Table IV-5. Two identical filters were provided in the tertiary filter unit. A flexible filter bag was provided in the filter, and its specific property parameters were shown in Table IV-5.

The filter area of the filter in the tertiary filter unit was 10 times the filter area of the filter in the primary filter unit.

TABLE IV-5

| | Flexible filter bag of the filter in the primary filter unit | | | | Flexible filter bag of the filter in the tertiary filter unit |
|---|---|---|---|---|---|
| | Solid-removal layer | Precision layer | Base cloth layer | Lining layer | |
| Material | Polytetrafluoroethylene | Polytetrafluoroethylene | Polytetrafluoroethylene | Polytetrafluoroethylene and polyimide | Polytetrafluoroethylene |
| Porosity | 95% | 95% | 40% | 37% | 90% |
| Fineness D | / | 0.2-0.3 | / | 1-3 | / |
| Basis weight | | | 580 ± 5% g/m² | | 650 ± 5% g/m² |
| Warp-direction breaking strength | | | 2350 N/5 cm | | 2600 N/5 cm |
| Weft-direction breaking strength | | | 2600 N/5 cm | | 2850 N/5 cm |
| Thickness | | | 2.6 ± 10% mm | | 0.9 ± 10% mm |
| Filtering precision | | | 2 μm | | 0.4 μm |

Examples IV-6 to IV-8

This group of examples was used to illustrate an oil slurry filtration process by using the multiple-stage oil slurry filter systems of Examples IV-1 to IV-3.

In Example IV-6, the oil slurry G was sent to the multiple-stage oil slurry filter system of Example IV-1 and filtered. The oil slurry G was sent to the primary filter unit and filtered with the filter therein, and the resulting filtered oil was sent to the secondary filter unit and the tertiary filter unit in turn, and filtered to obtain a final filtered oil. The filtration temperature of the filter in the primary filter unit was 100° C., the filtration was set to proceed until the pressure difference was 0.12 MPa, the blowback began, and the blowback with nitrogen gas at 100° C. was performed. The filter pressure difference between the inlet and the outlet of the secondary filter unit was monitored, the residue unloading means was started-up by the motor driving, and it took three seconds to make one revolution. The filtration temperature of the filter in the tertiary filter unit was 80° C., and no blowback was performed. The collected final filtered oil was analyzed, and the solid particle content was 48 μg/g.

In Example IV-7, the oil slurry H was sent to the multiple-stage oil slurry filter system of Example IV-2 and filtered. The oil slurry H was sent to the primary filter unit and filtered with the filter therein, and the resulting filtered oil was sent to the filter of the tertiary filter unit in turn, and filtered to obtain a final filtered oil. The filtration temperature of the filter in the primary filter unit was 140° C., the filtration was set to proceed until the pressure difference was 0.20 MPa, the blowback began, and the blowback with nitrogen gas at 140° C. was performed. The filtration temperature of the filter in the tertiary filter unit was 120° C., and no blowback was performed. The collected final filtered oil was analyzed, and the solid particle content was 77 μg/g.

In Example IV-8, the oil slurry I was sent to the multiple-stage oil slurry filter system of Example IV-3 and filtered. The oil slurry I was sent to the primary filter unit and filtered with the filter therein, and the resulting filtered oil was sent to the secondary filter unit and the tertiary filter unit in turn, and filtered to obtain a final filtered oil. The filtration temperature of the filter in the primary filter unit was 200° C., the filtration was set to proceed until the pressure difference was 0.30 MPa, the blowback began, and the blowback with nitrogen gas at 200° C. was performed. The filter pressure difference between the inlet and the outlet of the secondary filter unit was monitored, the residue unloading means was started-up by the motor driving, and it took three seconds to make one revolution. The filtration temperature of the filter in the tertiary filter unit was 160° C., and no blowback was performed. The collected final filtered oil was analyzed, and the solid particle content was 185 μg/g.

Examples IV-9 to IV-10

This group of examples was used to illustrate an oil slurry filtration process by using the multiple-stage oil slurry filter systems of Examples IV-4 to IV-5.

In Example IV-9, the coal tar E was sent to the multiple-stage oil slurry filter system of Example IV-4 and filtered. The coal tar E was sent to the primary filter unit and filtered with the filter therein, and the resulting filtered oil was sent to the secondary filter unit, and filtered to obtain a final filtered oil. The filtration temperature of the filter in the primary filter unit was 70° C., the filtration was set to proceed until the pressure difference was 0.30 MPa, the blowback began, and the blowback with nitrogen gas at normal temperature was performed. The filter pressure difference between the inlet and the outlet of the secondary filter unit was monitored, the residue unloading means was started-up by the motor driving, and it took three seconds to make one revolution. The collected final filtered oil was analyzed, and the solid particle content was 151 μg/g.

In Example IV-10, the coal tar F was sent to the multiple-stage oil slurry filter system of Example IV-5 and filtered. The coal tar F was sent to the primary filter unit and filtered with the filter therein, and the resulting filtered oil was sent to the filter of the tertiary filter unit, and filtered to obtain a final filtered oil. The filtration temperature of the filter in the primary filter unit was 90° C., the filtration was set to proceed until the pressure difference was 0.35 MPa, the blowback began, and the blowback with nitrogen gas at 90° C. was performed. The filtration temperature of the filter in the tertiary filter unit was 90° C., and no blowback was performed. The collected final filtered oil was analyzed, and the solid particle content was 192 μg/g.

INDUSTRIAL APPLICABILITY

Due to the use of the filter component of flexible texture in the oil slurry filter of the present invention, it is possible to reduce the abrasion of the filter, extend the service life of the filter, make the backwash treatment of the filter residue more convenient, improve the regeneration efficiency of the filter, and extend the performance period of the oil slurry filter.

Furthermore, with the oil slurry filtration process by using the oil slurry filter of the present invention, the long-term stable operation of the oil slurry filtration process can be ensured, and the problems of the filter material being easily blocked by high-viscosity colloidal impurities, the poor regeneration efficiency and the low removal efficiency can be solved.

The invention claimed is:

1. An oil slurry filter, which comprises at least one filter component of flexible texture, said filter component of flexible texture is formed from flexible filter material, said flexible filter material is made from at least one material selected from polypropylene, polyethylene, nylon, polyamide fiber, polyester fiber, polypropylene fiber, polyphenylene sulfide, polyimide, polytetrafluoroethylene, aramid fiber, polyurethane, glass fiber, and vinylon,
wherein said flexible filter material has a basis weight of 300-1000 g/m²; a warp-direction breaking strength of 850 N/5 cm-9000 N/5 cm, a weft-direction breaking strength of 1000 N/5 cm-11000 N/5 cm; a thickness of 0.5-3.4 mm,
wherein said flexible filter material at least includes a solid-removal layer and a base cloth layer; said solid-removal layer and said base cloth layer are provided adjacently, said solid-removal layer has a porosity of 85%-98%; said base cloth layer has a porosity of 30%-40%, the flexible filter material has a filtering precision of 0.1-25 micrometers;
wherein the filter is an up-flow filter, said oil slurry filter includes an oil slurry inlet arranged at a lower part of the filter, a filtered oil outlet arranged at an upper part of the filter, a filter residue outlet arranged at the lower part and/or a bottom of the filter, and a purge medium inlet arranged at a top and/or the upper part of the filter.

2. The oil slurry filter according to claim 1, wherein said filter component of flexible texture is in the form of a flexible filter bag, the flexible filter bag is prepared by a stitching process, and the pores from stitching are sealed with an acidic sealant material.

3. The oil slurry filter according to claim 1, wherein said flexible filter material has a filtering precision of 0.1-15 micrometers; or
the flexible filter material has a filtering precision of 2-15 micrometers; or
the flexible filter material has a filtering precision of 3-25 micrometers; or
the flexible filter material has a filtering precision of 0.1 to less than 2 micrometers.

4. The oil slurry filter according to claim 1, wherein said base cloth layer is made from polytetrafluoroethylene or polyphenylene sulfide; said solid-removal layer is made from polytetrafluoroethylene with a three-dimensional void structure.

5. The oil slurry filter according to claim 1, wherein said flexible filter material at least includes the solid-removal layer, the base cloth layer and a lining layer, said lining layer is located on a side of the base cloth layer opposite to the solid-removal layer, and made from fibers having a fineness of 1-3 D; a raw material of fibers of which said lining layer is made is one or more materials selected from polyethylene, nylon, polyester fiber, polypropylene fiber, polyphenylene sulfide, polyimide, polytetrafluoroethylene, aramid fiber, polyurethane, and glass fiber.

6. The oil slurry filter according to claim 1, wherein said flexible filter material at least includes the solid-removal layer, a precision layer, said base cloth layer and a lining layer, said precision layer is located between the solid-removal layer and the base cloth layer, and said precision layer is made from superfine fibers having a fineness of 0.2-0.3 D; a raw material of fibers of which said precision layer is made is one or more materials selected from polyethylene, nylon, polyester fiber, polypropylene fiber, polyphenylene sulfide, polyimide, polytetrafluoroethylene, aramid fiber, polyurethane, and glass fiber.

7. The oil slurry filter according to claim 1, wherein the filter component of flexible texture includes a filter cake layer formed from a filter aid provided on said filter component; said filter aid is selected from diatomite, cellulose, perlite, talcum powder, activated clay, filter residue obtained from a filter, spent catalytic cracking catalysts or mixtures thereof; the filter cake layer formed from the filter aid has a thickness of 0.1-10 mm.

8. An oil slurry filter unit, which includes at least two oil slurry filters according to claim 1, said oil slurry filters are in series connection or parallel connection.

9. The oil slurry filter unit according to claim 8, which includes an oil slurry inlet pipeline and a filtered oil outlet pipeline respectively in communication with each filter; optionally a filter residue discharge pipeline respectively in communication with each filter; optionally a purge medium buffer tank and a purge medium inlet pipeline respectively in communication with each filter; optionally a filter aid buffer tank and a filter aid inlet pipeline respectively in communication with each filter.

10. The oil slurry filter unit according to claim 9, wherein said purge medium is an inert gas or a flushing oil; said filter aid is selected from diatomite, cellulose, perlite, talcum powder, activated clay, filter residue obtained from a filter, spent catalytic cracking catalysts or mixtures thereof; the filter aid and a mixing medium are loaded in a filter aid buffer tank, said mixing medium is a liquid hydrocarbon.

11. A multiple-filter system for an oil slurry filtration, which includes a filter system and a control system;
    the filter system includes the oil slurry filter unit according to claim 8;
    said control system includes an online pressure difference monitoring module, a filter control module and a purge control module, said online pressure difference monitoring module is used to monitor the pressure difference of the filter used online, said filter control module is used to control the filter to switch on and switch off the filter system, and said purge control module is used to control the blowback process of the filter.

12. The multiple-filter system according to claim 11, wherein said online pressure difference monitoring module includes pressure gauge(s) or differential- pressure gauge(s) provided on an oil slurry inlet pipeline and a filtered oil outlet pipeline of each filter, said filter control module includes control valve(s) provided on the oil slurry inlet pipeline, the filtered oil outlet pipeline and a filter residue discharge pipeline of each filter, said purge control module includes control valve(s) provided on a purge medium inlet pipeline of each filter.

13. A multiple-stage filter system for the oil slurry filtration, which includes: (i) a primary filter unit and a secondary filter unit, or (ii) a primary filter unit and a tertiary filter unit, or (iii) a primary filter unit, a secondary filter unit and a tertiary filter unit;
    wherein said primary filter unit includes a first filter system, said first filter system includes the oil slurry filter unit according to claim 8;
    said secondary filter unit includes an automatic backwashing filter device having a driving means;
    said tertiary filter unit includes a second filter system, said second filter system includes at least one filter;
    the filtering precision of said secondary filter unit is less than the filtering precision of the primary filter unit, the filtering precision of said tertiary filter unit is less than the filtering precision of said primary filter unit and less than the filtering precision of said secondary filter unit;
    wherein when the multiple-stage oil slurry filter system includes the primary filter unit and the secondary filter unit, a filtered oil outlet(s) of the primary filter unit is in communication with an inlet of the secondary filter unit; or
    when the multiple-stage oil slurry filter system includes the primary filter unit and the tertiary filter unit, a filtered oil outlet(s) of the primary filter unit is in communication with an inlet of the tertiary filter unit; or
    when the multiple-stage oil slurry filter system includes the primary filter unit, the secondary filter unit and the tertiary filter unit, a filtered oil outlet(s) of the primary filter unit is in communication with an inlet of the secondary filter unit and an inlet of the tertiary filter unit respectively, a filtered oil outlet of the secondary filter unit is in communication with the inlet of the tertiary filter unit; or
    when the multiple-stage oil slurry filter system includes the primary filter unit, the secondary filter unit and the tertiary filter unit, a filtered oil outlet(s) of the primary filter unit is in communication with the inlet of the secondary filter unit, a filtered oil outlet of the secondary filter unit is in communication with an inlet of the tertiary filter unit.

14. The multiple-stage filter system according to claim 13, wherein the filtering precision of said primary filter unit is 2-25 micrometers; the filtering precision of said secondary filter unit is 1-5 micrometers; the filtering precision of said tertiary filter unit is 0.1-1.0 micrometer.

15. The multiple-stage filter system according to claim 13, wherein the filter area of said secondary filter unit is one twentieth to one-tenth of the filter area of the primary filter unit; the filter area of said tertiary filter unit is 1.5-20 times the filter area of the primary filter unit.

16. An oil slurry filtration process, which comprises a filtration step of sending an oil slurry to the oil slurry filter according to claim 1 to carry out the filtration.

17. The oil slurry filtration process according to claim 16, wherein a pressure difference generated by the filter is 0.01-0.5 MPa; a filtration temperature is 30-250° C.

18. The slurry filtration process according to claim 16, which further comprises a blowback step of using a purge medium to blowback the filter.

19. The slurry filtration process according to claim 16, which further comprises a filter cake layer formation step that before the filtration step, a filter aid is sent to the filter to form a filter cake layer of the filter aid on the filter component of the filter.

20. An oil slurry filtration process, which comprises:
    (1) filtration step: in a filter system, allowing an oil slurry to be sent to a part of at least two oil slurry filters according to claim 1;
    (2) control step: allowing an online pressure difference monitoring module to monitor a pressure difference of filters online in the filtration step, allowing a filter control module to control the filters in the filtration step to switch on and switch off the filter system, allowing a purge control module to control a blowback process of the filters in the filtration step; and
    (3) blowback step: using a purge medium to blowback the filter that is switched off the filter system, wherein
    when the online pressure difference monitoring module monitors that the pressure difference of the filter online in the filtration step reaches a set value I, the remaining part of the filters in the filtration step are switched on the filter system through a filter control module and used in the filtration step for filtering, and the filter online in the filtration step of which the pressure difference reaches the set value I is switched off the filter system, said set value I is in a range of 0.01-5 MPa,
    the filter that is switched off the filter system is subjected to a residue unloading and the blowback with a purge medium through the purge control module,
    in the filter online in the filtration step, the filtration temperature is 30-250° C.

21. The slurry filtration process according to claim 20, wherein when the online pressure difference monitoring module monitors that a pressure difference of the filter online in the filtration step reaches a set value II, the remaining part of the filters in the filtration step are switched on the filter system through the filter control module and used in the filtration step, when the online pressure difference monitoring module monitors that the pressure difference of the online filter that is subsequently switched-on reaches a set value III, the online filter of which the pressure difference reaches or exceeds a set value II is switched off the filter system; provided with that set value III<set value II<set value I; and a set volume II and a set value III are in the range of 0.01 to 5 MPa.

22. The slurry filtration process according to claim 20, wherein before (1) filtration step, said process further comprises:
    (1') filter cake layer formation step: allowing a filter aid to be sent to the part of the filters in the filtration step of at least two oil slurry filters to form a filter cake layer of the filter aid in the filters in the filtration step;
    in the filtration step, the oil slurry is sent to the filter in which the filter cake layer of the filter aid has been formed;
    when the online pressure difference monitoring module monitors that the pressure difference of the filter in the filter cake layer formation step reaches a set value IV, the filter in which the filter cake layer is formed is switched on the filtration step through the filter control module to carry out the oil slurry filtering, said set value IV is in the range of 0.01 to 0.07 MPa.

23. An oil slurry filtration process, which comprises:
    a primary filtration step: allowing an oil slurry to be sent to a primary filter unit and filtered to obtain a primary filtered oil slurry, said primary filter unit includes a first filter system, said first filter system includes the oil slurry filter unit according to claim 8; and
    allowing the primary filtered oil slurry to be sent to a secondary filter unit and/or a tertiary filter unit and filtered;
    said secondary filter unit includes an automatic backwashing filter device having a driving means;
    said tertiary filter unit includes a second filter system, said second filter system includes at least one filter;
    a filtering precision of said secondary filter unit is less than the filtering precision of the filter in the primary filter unit, and the filtering precision of said tertiary filter unit is less than the filtering precision of the primary filter unit and less than the filtering precision of the secondary filter unit.

24. The slurry filtration process according to claim 23, wherein the filtering precision of said primary filter unit is 2-25 micrometers; the filtering precision of said secondary filter unit is 1-5 micrometers; the filtering precision of said tertiary filter unit is 0.1-1.0 micrometer.

25. The slurry filtration process according to claim 23, wherein a filtration temperature of the filters in the first filter system is 30-250° C.; a pressure difference set for the filters in the first filter system is 0.01-0.5 MPa; the filtration temperature of the filter in the second filter system is 30-250° C.

* * * * *